US012342330B2

(12) United States Patent
Zhang et al.

(10) Patent No.: US 12,342,330 B2
(45) Date of Patent: Jun. 24, 2025

(54) USER EQUIPMENT (UE) INDICATION ENHANCED BANDWIDTH PART (BWP) RELATED CAPABILITY

(71) Applicant: QUALCOMM Incorporated, San Diego, CA (US)

(72) Inventors: Qian Zhang, Basking Ridge, NJ (US); Yan Zhou, San Diego, CA (US); Peter Gaal, San Diego, CA (US); Juan Montojo, San Diego, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 17/809,482

(22) Filed: Jun. 28, 2022

(65) Prior Publication Data
US 2023/0422225 A1    Dec. 28, 2023

(51) Int. Cl.
*H04W 72/0453* (2023.01)
*H04L 5/14* (2006.01)

(52) U.S. Cl.
CPC .......... *H04W 72/0453* (2013.01); *H04L 5/14* (2013.01)

(58) Field of Classification Search
CPC ................................................ H04W 72/0453
See application file for complete search history.

(56) References Cited

U.S. PATENT DOCUMENTS

| 2019/0082425 | A1* | 3/2019 | Li | ........................ H04L 5/0055 |
| 2019/0261444 | A1* | 8/2019 | Axmon | ................ H04W 76/28 |
| 2021/0152418 | A1* | 5/2021 | Abdelghaffar | ....... H04B 7/0602 |
| 2021/0321409 | A1 | 10/2021 | Fakoorian et al. | |
| 2022/0182160 | A1* | 6/2022 | Su | ....................... H04B 17/309 |

FOREIGN PATENT DOCUMENTS

| CN | 110611957 A | * 12/2019 | ........... H04L 5/0042 |
| WO | 2021216595 A1 | 10/2021 | |

OTHER PUBLICATIONS

International Search Report and Written Opinion—PCT/US2023/025186—ISA/EPO—Oct. 19, 2023.

* cited by examiner

*Primary Examiner* — Samina F Choudhry
(74) *Attorney, Agent, or Firm* — QUALCOMM Incorporated

(57) ABSTRACT

Certain aspects of the present disclosure provide a method for wireless communications by a user equipment (UE). The UE transmits an indication of a capability of the UE to support downlink and uplink bandwidth part (BWP) pairs that have non-aligned center frequencies. The UE receives signaling configuring the UE with a downlink BWP and an uplink BWP with the non-aligned center frequencies for full-duplex operation, in accordance with the indicated UE capability.

22 Claims, 23 Drawing Sheets

| gNB | UE | Comments |
|---|---|---|
| FD Disabled | FD Disabled | Baseline Operation |
| FD Disabled | FD Enabled | Use Case 1 for mTRP |
| FD Enabled | FD Disabled | Use Case 2 and IAB |
| FD Enabled | FD Enabled | Use Case 3 |

*FIG. 8*

USER EQUIPMENT (UE) INDICATION ENHANCED BANDWIDTH PART (BWP) RELATED CAPABILITY

BACKGROUND

Field of the Disclosure

Aspects of the present disclosure relate to wireless communications, and more particularly, to techniques for supporting bandwidth part (BWP) pairs having non-aligned center frequencies for full-duplex operation.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE), comprising: transmitting an indication of a capability of the UE to support downlink and uplink bandwidth part (BWP) pairs that have non-aligned center frequencies; and receiving signaling configuring the UE with a downlink BWP and an uplink BWP with the non-aligned center frequencies for full-duplex operation, in accordance with the capability.

Another aspect provides a method for wireless communications by a network entity, comprising: receiving an indication of a capability of a UE to support downlink and uplink BWP pairs that have non-aligned center frequencies; and configuring the UE with a downlink BWP and an uplink BWP with the non-aligned center frequencies for full-duplex operation, in accordance with the capability.

Another aspect provides a method for wireless communications by a UE, comprising: transmitting an indication of a UE capability of changing a radio frequency (RF) bandwidth (BW) for at least one of reception or transmission; and receiving signaling configuring the UE to switch from a half-duplex RF BW operation to a full-duplex RF BW operation, in accordance with the indication.

Another aspect provides a method for wireless communications by a network entity, comprising: receiving an indication of a UE capability of changing a RF BW for at least one of reception or transmission; and configuring a UE to switch from a half-duplex RF BW operation to a full-duplex RF BW operation, in accordance with the indication.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 5-8 depict different use cases for full-duplex (FD) communications.

DETAILED DESCRIPTION

Figure 1:
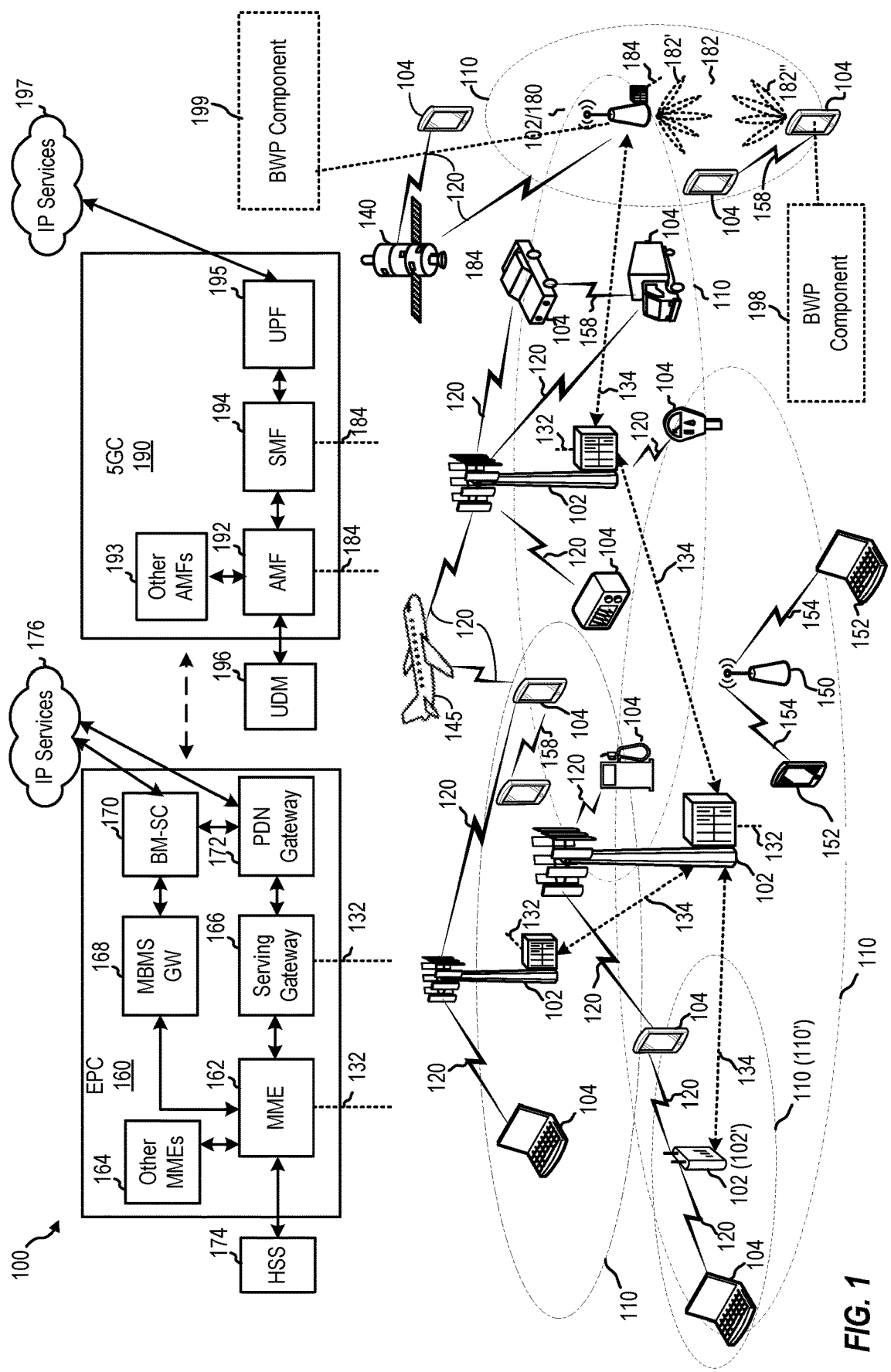
FIG. 1 depicts an example wireless communications network.

Aspects of the present disclosure provide apparatuses, methods, processing systems, and computer-readable mediums for supporting bandwidth part (BWP) pairs having non-aligned center frequencies for full-duplex operation.

Full-duplex communication allows for simultaneous transmission between nodes (e.g., a user equipment (UE) and a network entity). Half-duplex communication flows in one direction at a time.

In current systems, resources are allocated for bi-directional communication utilizing either time division duplexing (TDD) or frequency division duplexing (FDD). In either TDD or FDD, communication utilizing a single frequency channel is only possible in one direction at any given instant of time. Accordingly, FDD and TDD systems implement full-duplex functionality by either utilizing multiple frequency channels (as in the case of FDD) or by dividing the two directions of communication according to allocated time slots (as in the case of TDD).

In communication between a network entity (e.g., a base station) and a UE, simultaneous transmission and reception is accomplished using different resources for uplink and downlink, i.e. different frequencies (e.g., FDD) or time resources (e.g., TDD). While the FDD systems have separate uplink and downlink frequency bands, the TDD systems utilize a same bandwidth, but allocate different time slots for uplink and downlink. Compared to the FDI) systems, the TIM) systems have more flexibility when it comes to uplink and downlink. For example, the TDD systems can also more easily adapt the ratio between uplink and downlink traffic, and they don't need paired spectrum for uplink and downlink.

In current TDD systems (or half-duplex systems), a network entity may configure a downlink bandwidth part (BWP) and an uplink BWP with aligned center frequency. Each BWP may include a subset of a total cell bandwidth of a cell. For example, in case of the TDD systems, a BWP pair (e.g., the downlink BWP and the uplink BWP with a same BWP ID) must have a same center frequency (e.g., overlapping of the downlink BWP and the uplink BWP). This overlap prevents the use of the BWP pair for full-duplex operation.

Techniques proposed herein support the BWP pairs having the non-aligned center frequencies for the full-duplex operation. For example, a UE may indicate a capability of a non-aligned center frequency on a downlink BWP and an uplink BWP. A network entity may configure the non-aligned downlink BWP and uplink BWP for the UE for subband/frequency division multiplexed (FDMed) full-duplex operation. The downlink BWP and the uplink BWP may be separated from each other or partially overlap. The techniques proposed may result in reduced latency (e.g., as it may be possible to receive downlink signals in uplink slots during the full-duplex operation) and better resource utilization.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
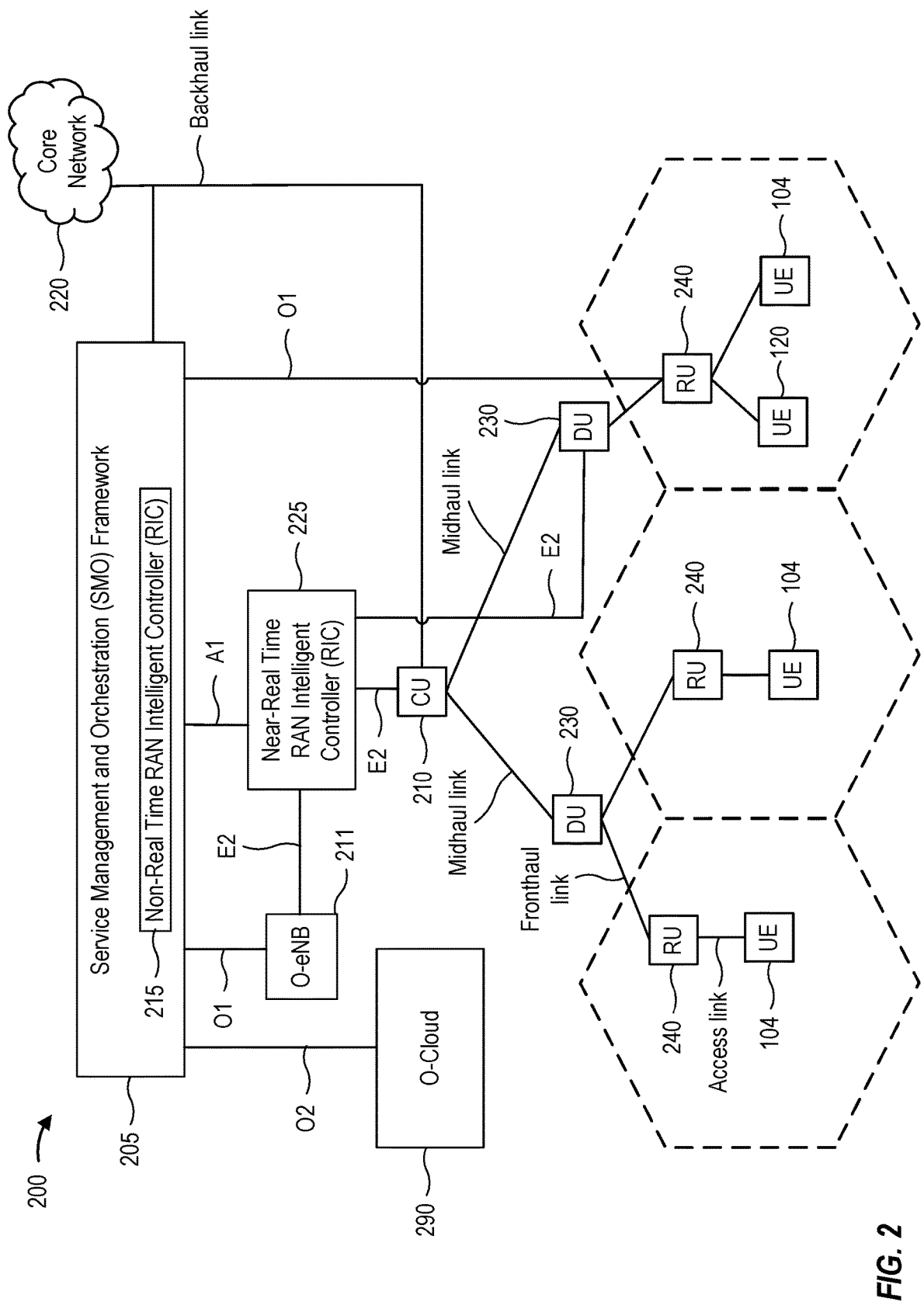
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (DUs), one or more radio units (RUs), a Near-Real Time (Near-RT) RAN Intelligent Controller (MC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mmWave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 15:
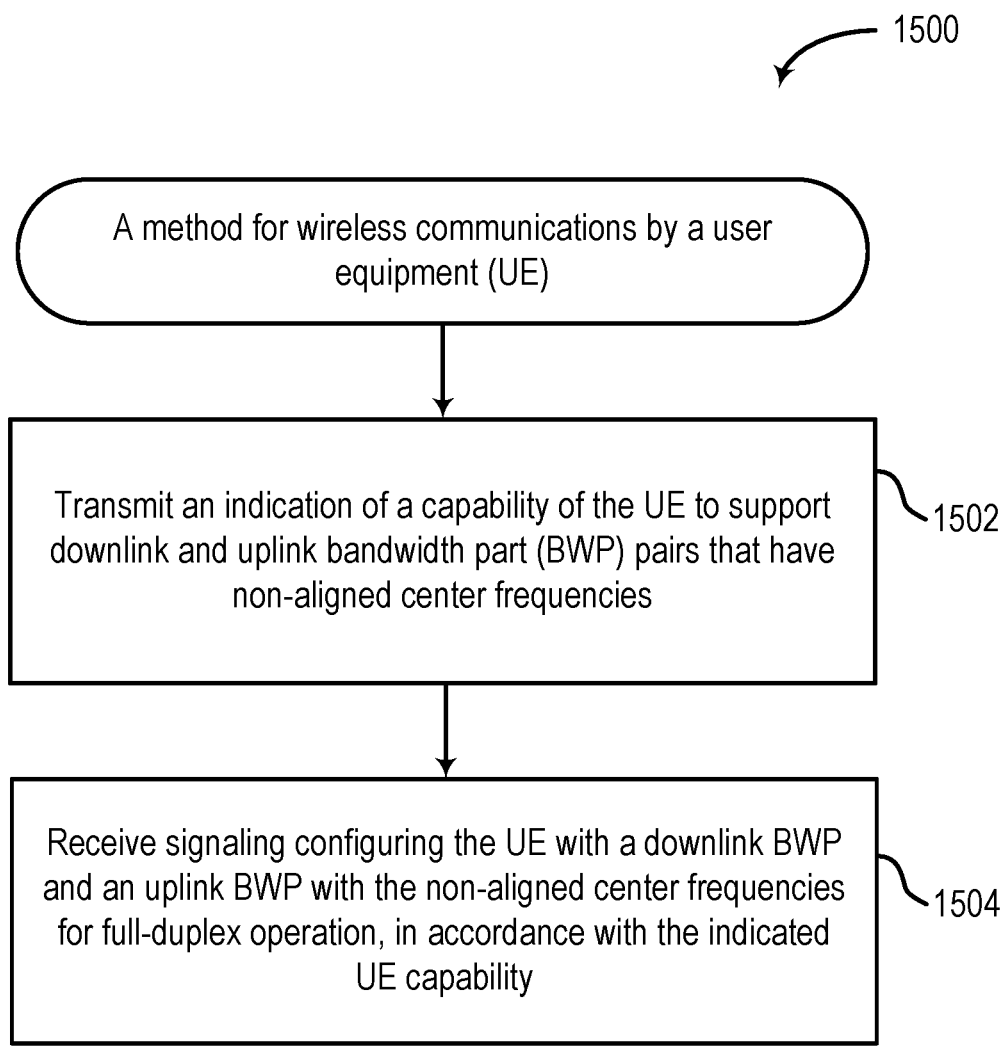
FIG. 15 depicts a method for wireless communications by a UE.
Figure 18:
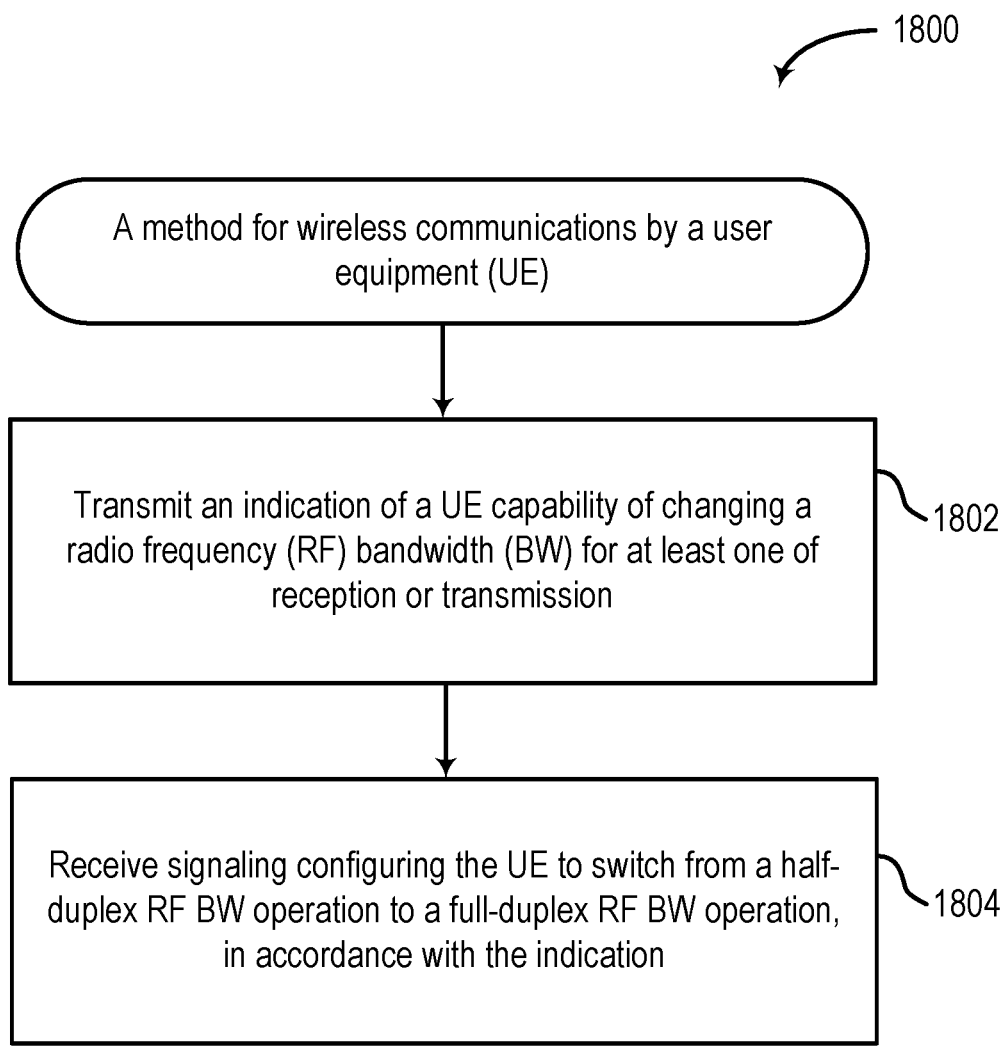
FIG. 18 depicts a method for wireless communications by a UE.

Wireless communication network 100 further includes bandwidth part (BWP) component 198, which may be configured to perform operations 1500 of FIG. 15 and/or operations 1800 of FIG. 18. Wireless communication network 100 further includes BWP component 199, which may be configured to perform operations 1600 of FIG. 16 and/or operations 1900 of FIG. 19.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT MC 215 or the Near-RT MC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
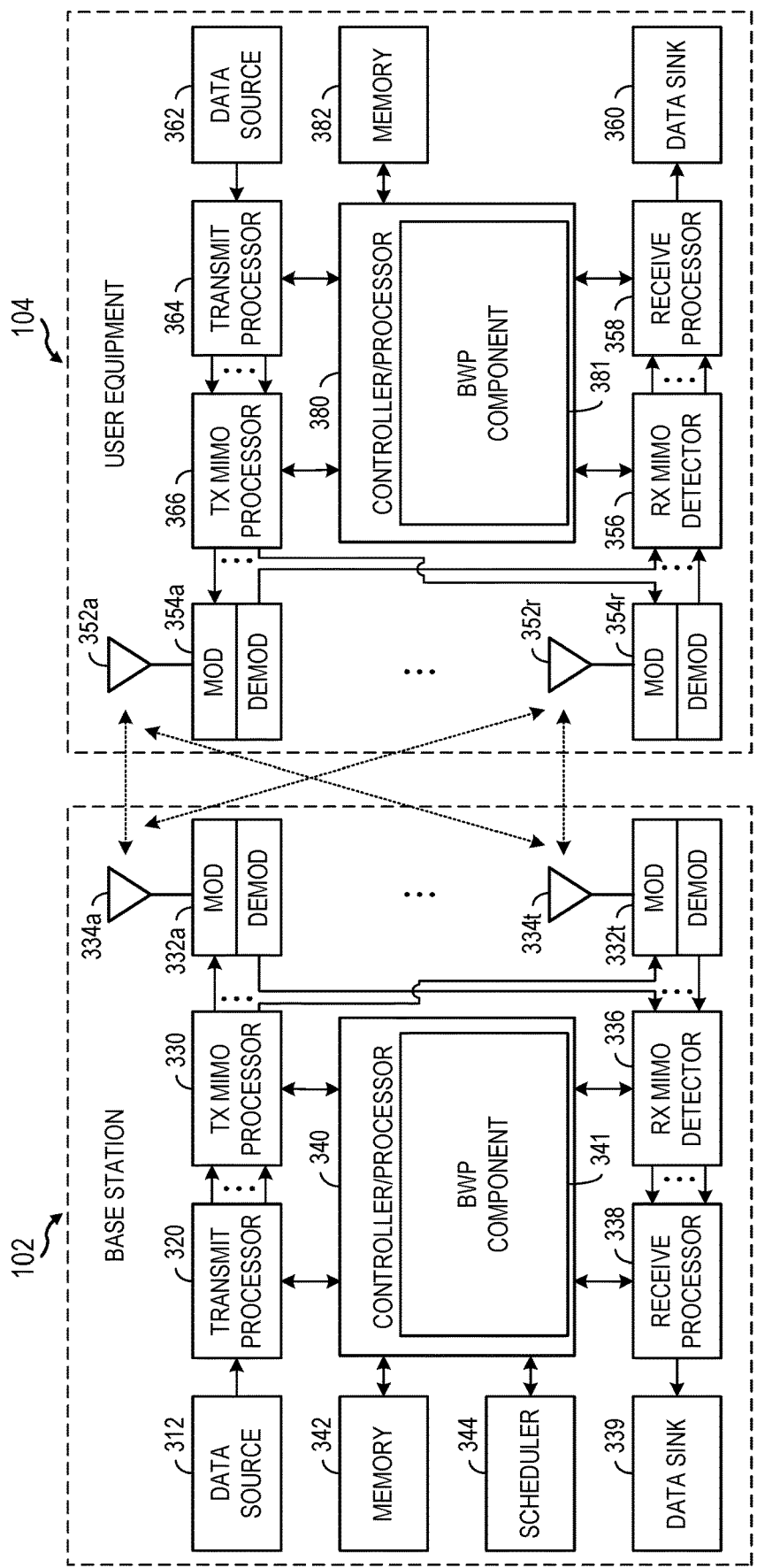
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes BWP component 341, which may be representative of BWP component 199 of FIG. 1. Notably, while depicted as an aspect of controller/processor 340, BWP component 341 may be implemented additionally or alternatively in various other aspects of BS 102 in other implementations.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes BWP component 381, which may be representative of BWP component 198 of FIG. 1. Notably, while depicted as an aspect of controller/processor 380, BWP component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
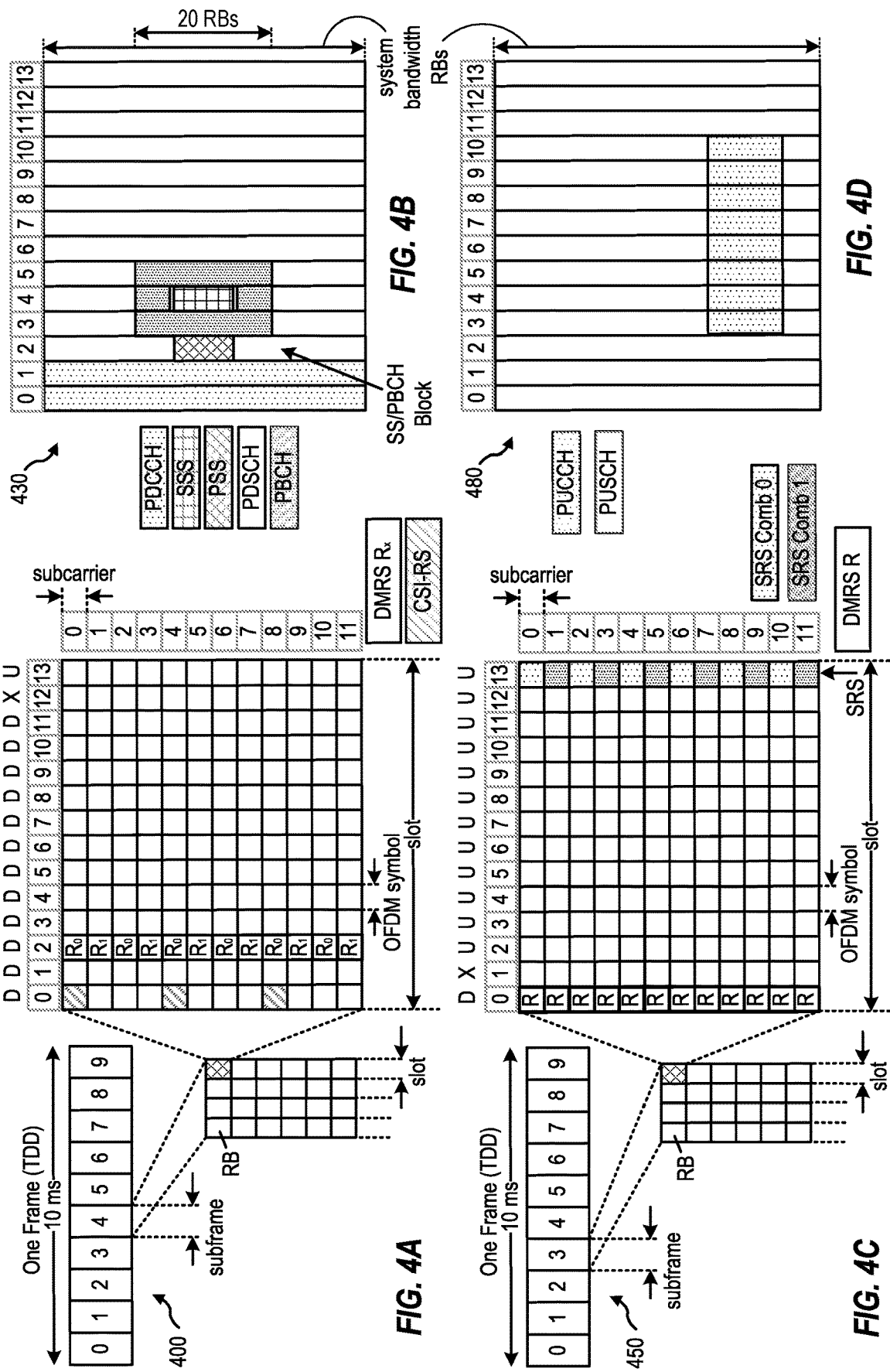
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Full-Duplex (FD) Use Cases

The techniques presented herein relate to supporting bandwidth part (BWP) (e.g., frequency band) pairs having non-aligned center frequencies for full-duplex (FD) operation. The FD allows for simultaneous transmission between nodes (e.g., a user equipment (UE) and a network entity). In a half-duplex (HD) system, communication flows in one direction at a time.

In some cases, after the initial network access, a UE is configured with one or more BWPs. Each BWP may include a numerology (e.g., including a slot), a physical resource block (PRB) grid to index mapping, and/or a control resource set (CORESET) numerology. The PRB grid may include a number of subcarriers in frequency and a number of symbols in time. The CORESET may indicate downlink control information (DCI) (e.g., carried in a physical downlink control channel (PDCCH)). The DCI may indicate which of the configured BWPs may be used (e.g., activate or deactivate) for downlink data transmissions (e.g., in a physical downlink shared channel (PDSCH)).

The techniques presented herein may be applied in various bands utilized for new radio (NR). For example, for a higher band referred to as frequency range (FR)4 (e.g., 52.6 GHz-114.25 GHz), an orthogonal frequency division multiplexing (OFDM) waveform with very large subcarrier spacing (SCS; 960 kHz-3.84 MHz) is required to combat severe phase noise. Due to a large SCS, a slot length tends to be very short. In a lower band referred to as FR2 (24.25 GHz to 52.6 GHz) with 120 kHz SCS, the slot length is 125 µSec, while in FR4 with 960 kHz, the slot length is 15.6 µSec. In some cases, a frequency band referred to as FR2x may be used.

There are various motivations for utilizing FD communications, for example, for simultaneous uplink/downlink transmissions in FR2. In some cases, FD capability may enable flexible time division duplexing (TDD) capability, and may be present at either a network entity or a UE or both. For example, at the UE, uplink transmissions may be sent from one antenna panel (e.g., of multiple antenna panels) and downlink receptions may be performed at another antenna panel. In another example, at a gNodeB (gNB), the uplink transmissions may be from one panel and the downlink receptions may be performed at another panel.

The FD capability may be conditional on a beam separation (e.g., self-interference between downlink and uplink, clutter echo, etc.). The FD capability may mean that the UE or the gNB is able to use frequency division multiplexing (FDM) or spatial division multiplexing (SDM) on slots conventionally reserved for uplink only or downlink only slots (or flexible slots that may be dynamically indicated as either an uplink or a downlink).

The potential benefits of the FD communications include latency reduction (e.g., it may be possible to receive downlink signals in what would conventionally be considered uplink only slots, which can enable latency savings), coverage enhancement, spectrum efficiency enhancements (per cell and/or per UE), and/or overall more efficient resource utilization.

Figure 5:
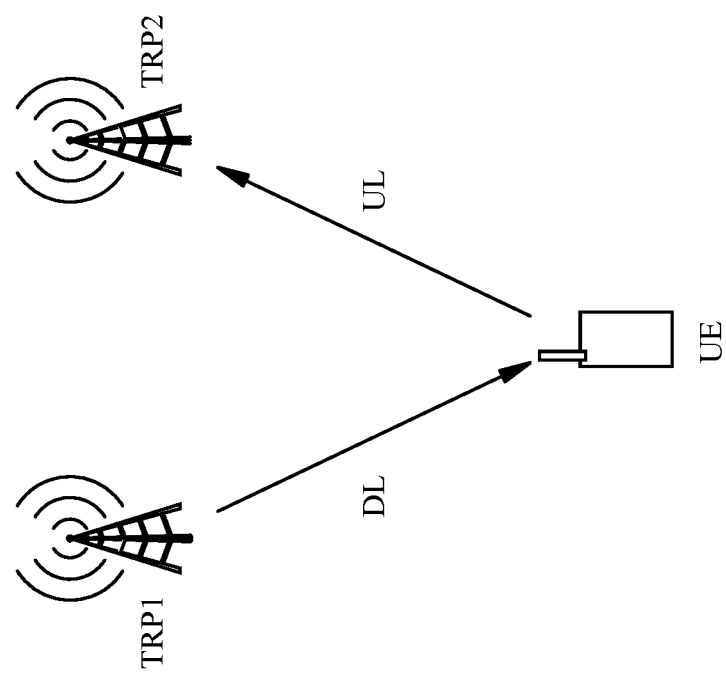
Figure 6:
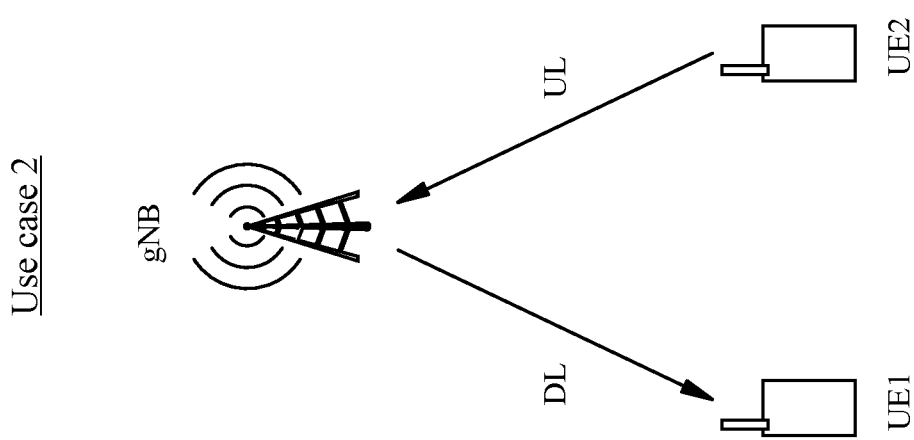
Figure 7:
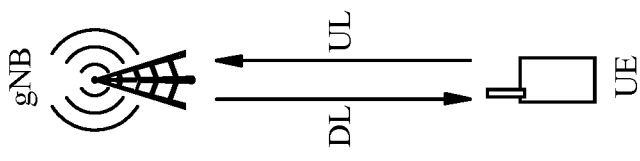

FIGS. 5-7 illustrate example use cases for FD communications. FIG. 8 summarizes certain possible features of these use cases.

As illustrated in FIG. 5, for a first use case (e.g., Use Case 1), one UE simultaneously communicates with a first transmitter receiver point (TRP 1) on a downlink, while transmitting to a second TRP on an uplink. For this use case, FD is disabled at a gNB (i.e., TRP) and enabled at the UE.

As illustrated in FIG. 6, for a second use case (e.g., Use Case 2), one gNB simultaneously communicates with a first UE (UE 1) on a downlink, while communicating with a second UE (UE 2) on an uplink. For this use case, FD is enabled at the gNB and disabled at the UE. Use cases with the FD enabled at the gNB and disabled at the UE may be suitable for integrated access and backhaul (IAB) applications as well (e.g., as illustrated in a table of FIG. 8).

As illustrated in FIG. 7, for a third use case (e.g., Use Case 3), a UE simultaneously communicates with a gNB, transmitting on an uplink while receiving on a downlink. For this use case, FD is enabled at both the gNB and the UE.

Figure 9:
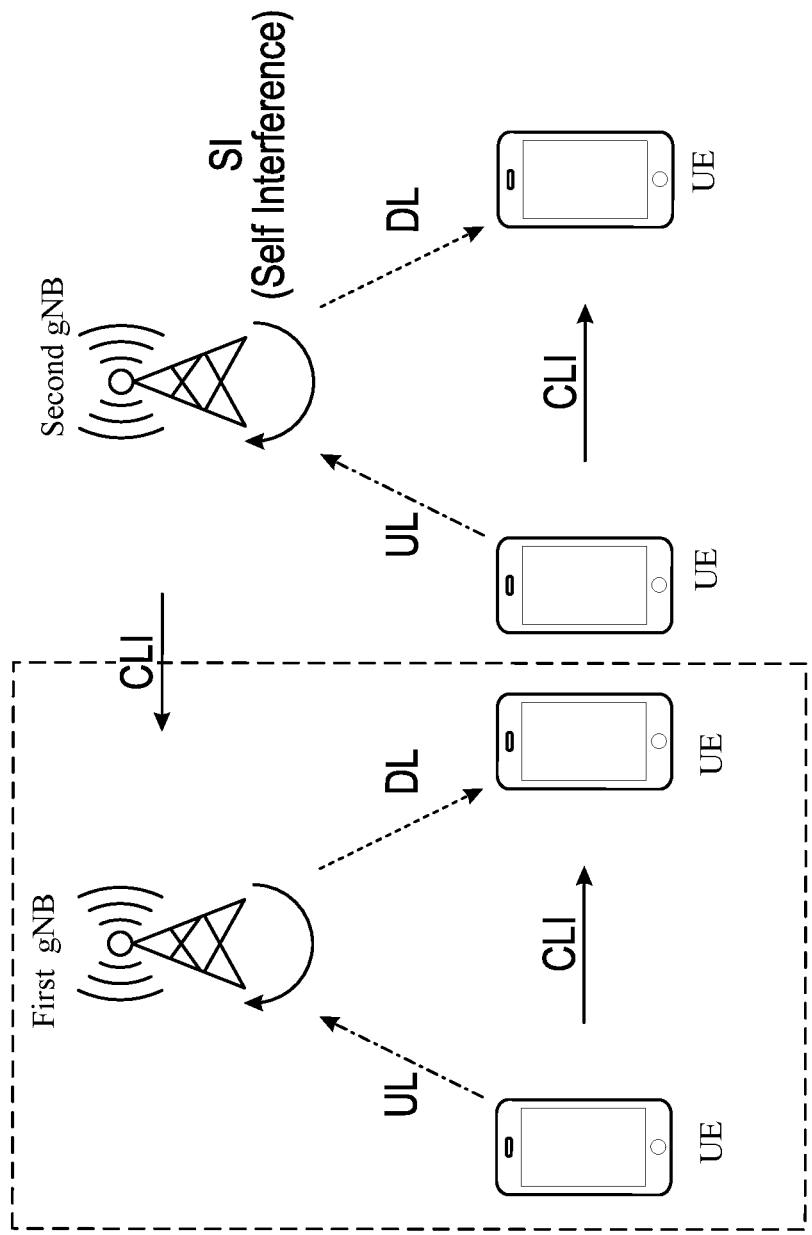
FIGS. 9-12 depict different deployment scenarios for FD and half-duplex (HD) communications.

As illustrated in FIG. 9, FD is enabled at gNB and disabled at UE. For example, a first gNB simultaneously communicates with one UE on a downlink while communicating with another UE on an uplink. Similarly, a second gNB simultaneously communicates with one UE on a downlink while communicating with another UE on an uplink. In some cases, implementation of FD communications/TDD systems may introduce a few challenges. One of them is cross-link interference (CLI), which occurs when one gNB (e.g., the first gNB) is transmitting, while another gNB (e.g., the second gNB) is receiving in a same frequency band. The gNBs usually transmit at higher power and have better propagation conditions between them, i.e., lower path loss compared to the link between gNB and UE. As a result, the CLI can be significant when the gNB in uplink is interfered by the downlink from another gNB. This may then result in a decrease in throughput. In this case, there may also be CLI between the UEs when one UE is transmitting, while another UE is receiving in a same frequency band.

Figure 10:
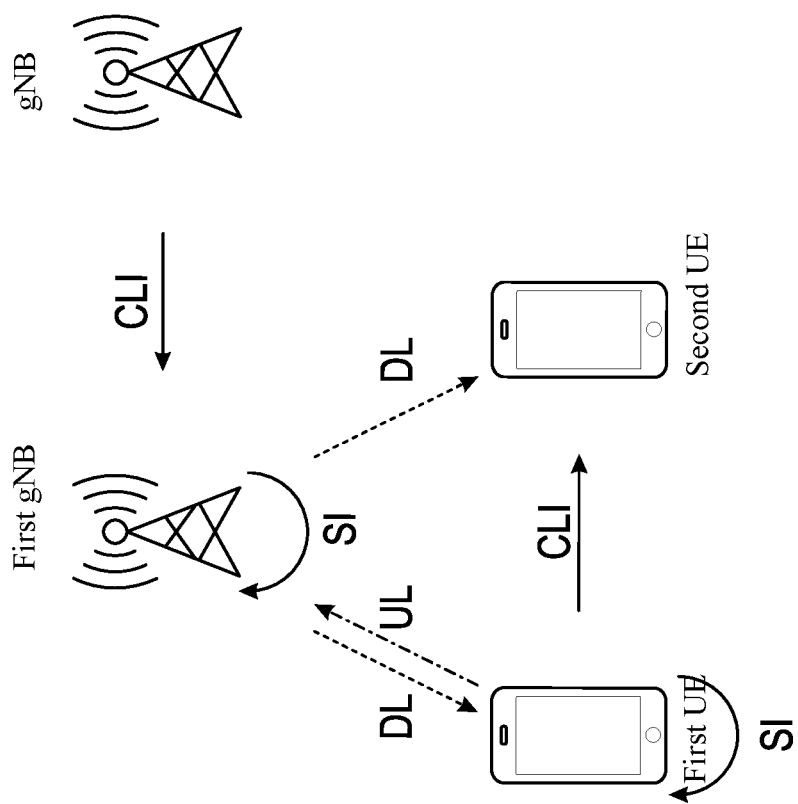

As illustrated in FIG. 10, FD is enabled at gNB and UE. For example, a first gNB simultaneously communicates with a first UE on downlink and uplink, while communicating with a second UE on a downlink. In this case, there may be CLI between the gNBs when one gNB is transmitting, while another gNB is receiving in a same frequency band. In this case, there may also be CLI between the UEs (e.g., from the first UE to the second UE) when one UE is transmitting, while another UE is receiving in a same frequency band.

Figure 11:
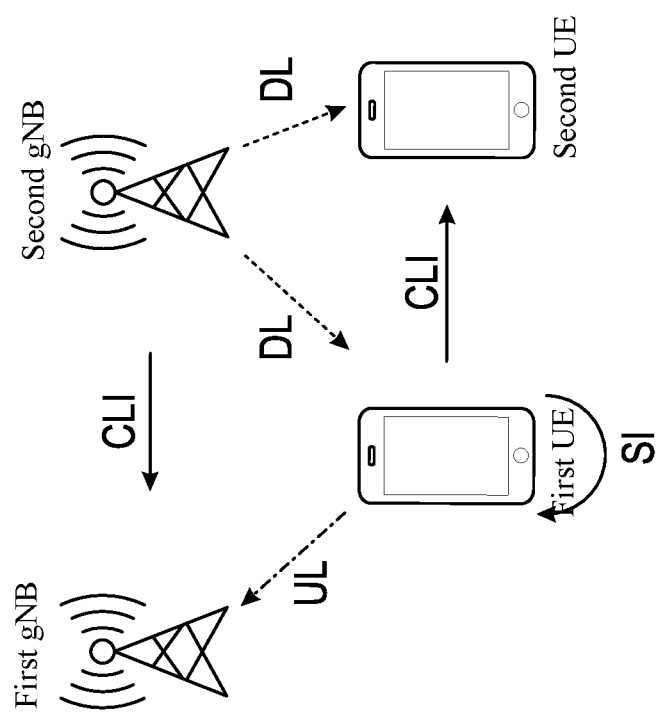

As illustrated in FIG. 11, HD is enabled at gNB and FD is enabled at UE. For example, a first gNB communicates with a first UE on an uplink, and a second gNB communicates with the first UE and a second UE on a downlink. The first UE simultaneously communicates with the first gNB on an uplink while communicating with the second gNB on a downlink. In this case, there may be CLI between the gNBs (e.g., from the second gNB to the first gNB) when one gNB is transmitting, while another gNB is receiving in a same frequency band. In this case, there may also be CLI between the UEs (e.g., from the first UE to the second UE) when one UE is transmitting, while another UE is receiving in a same frequency band.

Figure 12:
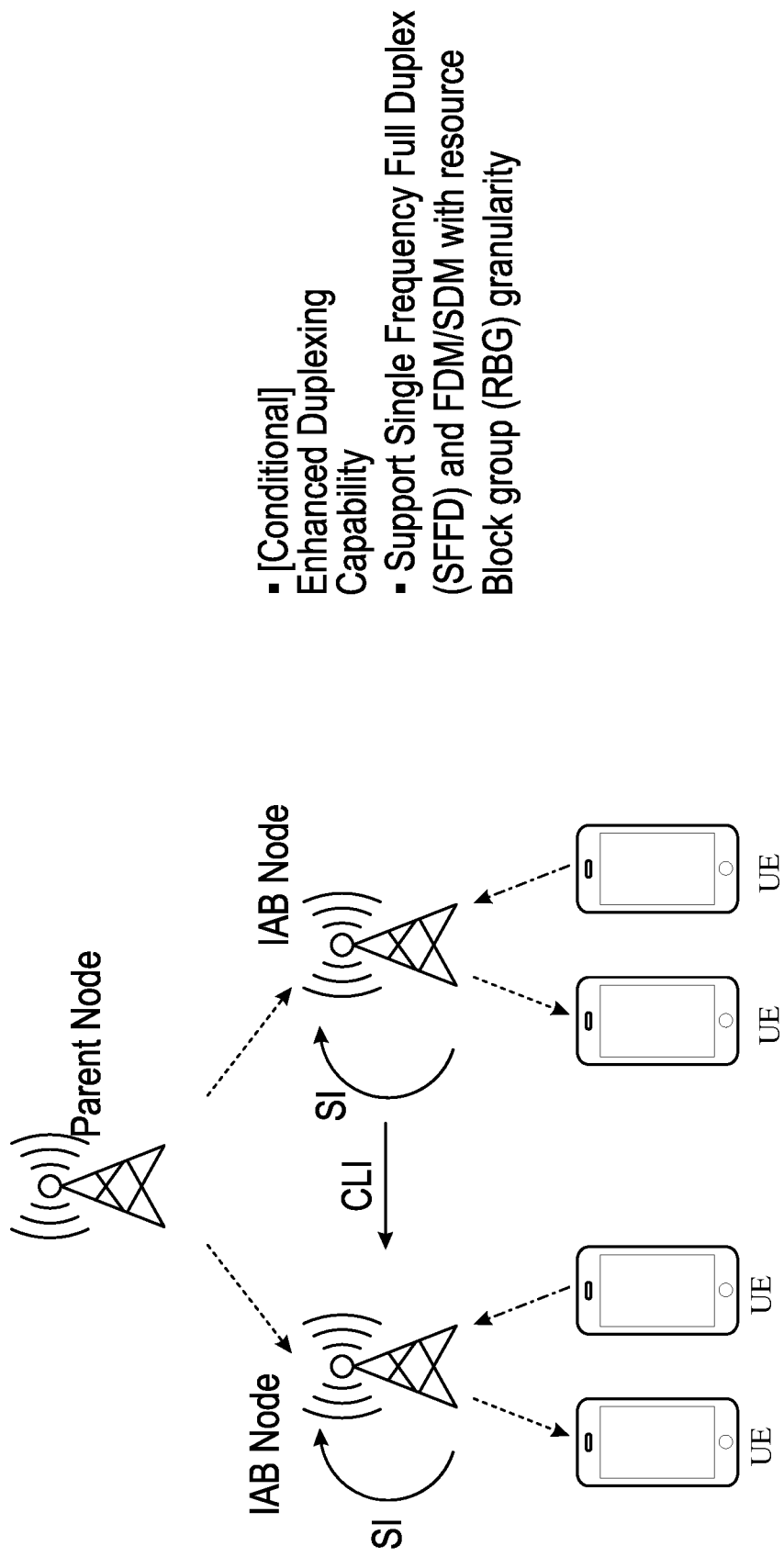

As illustrated in FIG. 12, a parent node (e.g., an IAB donor node) is associated with two child nodes (e.g., IAB nodes). The IAB node may be a network entity. Both the IAB nodes are FD enabled. For example, each IAB node simultaneously communicates with one UE on a downlink while communicating with another UE on an uplink. In this case, there may be CLI between the IAB nodes when one IAB node is transmitting, while another IAB node is receiving in a same frequency band.

Aspects Related to Non-Aligned Center Frequency on DL BWP and UL BWP

In current time division duplex (TDD) or half-duplex system, a network entity may configure a downlink bandwidth part (BWP) and an uplink BWP with aligned center frequency. For example, in case of the TDD system, a BWP pair (e.g., the downlink BWP and the uplink BWP with a same BWP ID) must have a same center frequency (e.g., overlapping of the downlink BWP and the uplink BWP). This prevents the use of the BWP pair for full-duplex operation.

Aspects of the present disclosure provide apparatuses, methods, processing systems, and computer-readable mediums for supporting BWP pairs having non-aligned center frequencies for full-duplex operation. For example, a user equipment (UE) may indicate a capability of a non-aligned center frequency on a downlink BWP and an uplink BWP. A network entity may configure the non-aligned downlink BWP and uplink BWP for the UE for subband/frequency division multiplexed (FDMed) full-duplex operation. The downlink BWP and the uplink BWP may be separated from each other or partially overlap.

As noted above, techniques proposed herein support the BWP pairs having the non-aligned center frequencies for the full-duplex operation. The full-duplex operation may result in a reduced latency (e.g., as it may be possible to receive downlink signals in uplink slots). The techniques proposed herein may be understood with reference to the FIGS. 13-16.

Figure 13:
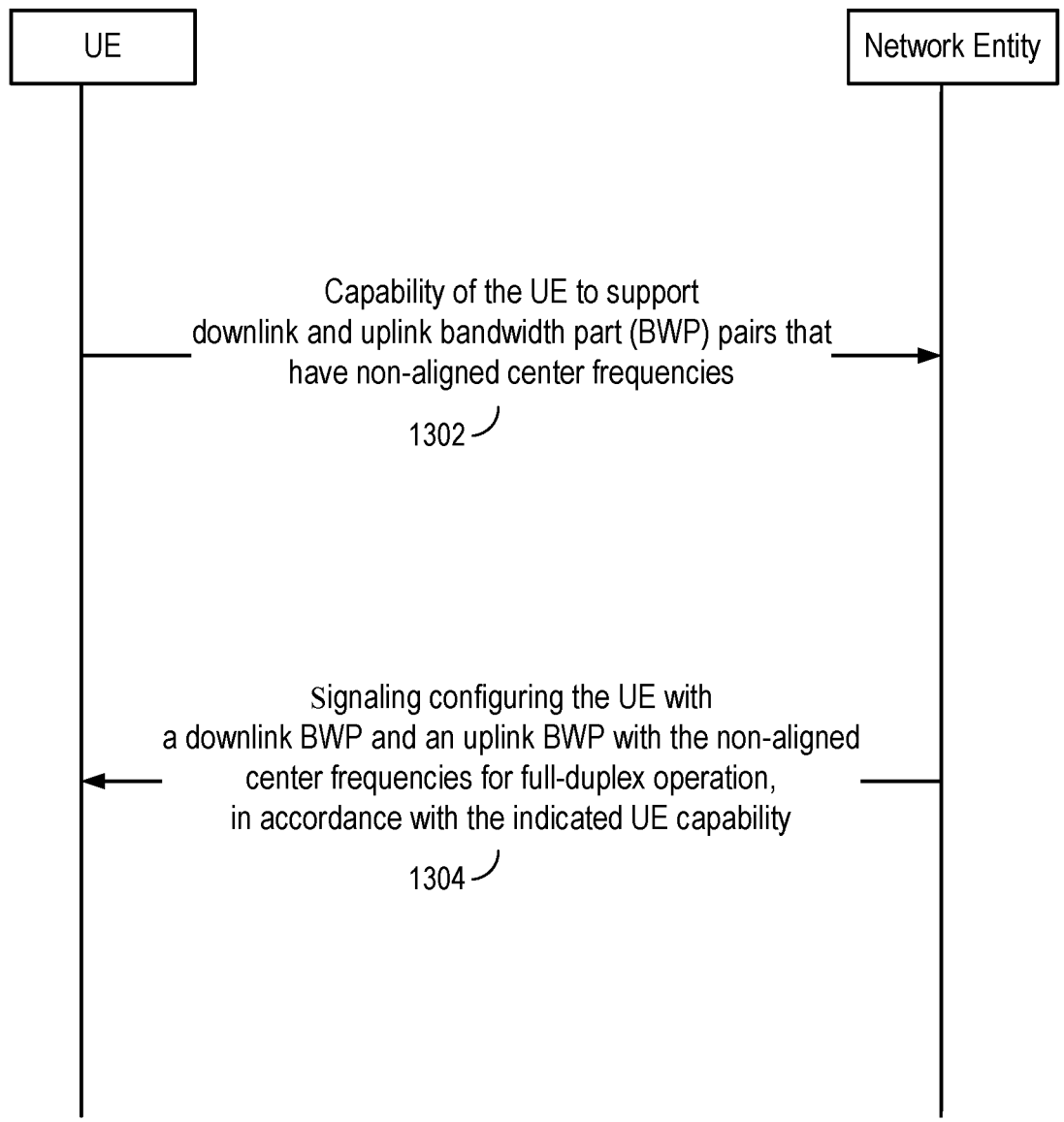
FIG. 13 depicts a call flow diagram illustrating example communication between a UE and a network entity.

As illustrated in FIG. 13, at 1302, a UE (e.g., such as UE 104 in wireless communication network 100 of FIG. 1) transmits an indication of a capability of the UE to support downlink and uplink BWP pairs that have non-aligned center frequencies to a network entity (e.g., such as gNodeB (gNB) or BS 102 in wireless communication network 100 of FIG. 1).

At 1304, the network entity transmits to the UE signaling configuring the UE with a downlink BWP and an uplink BWP with the non-aligned center frequencies for full-duplex operation, in accordance with the indicated UE capability.

Figure 14:
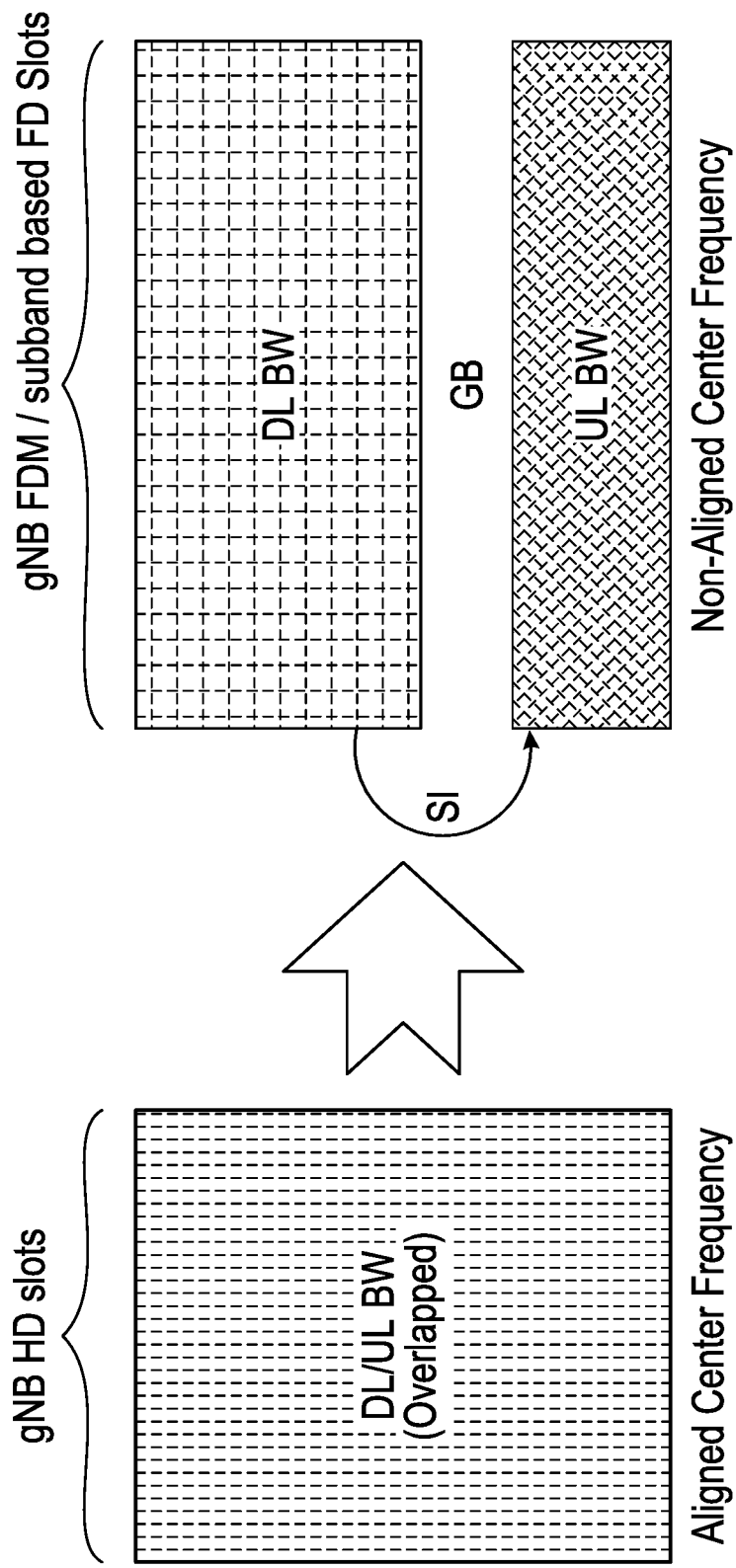
FIG. 14 depicts example downlink and uplink bandwidth parts (BWPs) having a non-aligned center frequency.

In certain aspects, the downlink BWP and the uplink BWP may not overlap. In certain aspects, as illustrated in FIG. 14, the downlink BWP and the uplink BWP may be separated by a guard band (GB). In certain aspects, the the downlink BWP and the uplink BWP may partially overlap. In certain aspects, the full-duplex operation is in an unpaired TDD spectrum.

FIG. 15 illustrates example operations 1500 for wireless communication. The operations 1500 may be performed, for example, by a UE (e.g., such as UE 104 in wireless communication network 100 of FIG. 1). The operations 1500 may be implemented as software components that are executed and run on one or more processors (e.g., controller/processor 380 of FIG. 3). Further, transmission and reception of signals by the UE in the operations 1500 may be enabled, for example, by one or more antennas (e.g., antennas 352 of FIG. 3). In certain aspects, the transmission and/or reception of signals by the UE may be implemented via a bus interface of one or more processors (e.g., the controller/processor 380) obtaining and/or outputting signals.

The operations 1500 begin, at 1502, by transmitting an indication of a capability of the UE to support downlink and uplink BWP pairs that have non-aligned center frequencies. For example, the UE may transmit the indication, using antenna(s) and/or transmitter/transceiver components of UE 104 shown in FIG. 1 or FIG. 3 and/or of the apparatus shown in FIG. 20.

At 1504, the UE receives signaling configuring the UE with a downlink BWP and an uplink BWP with the non-aligned center frequencies for full-duplex operation, in accordance with the indicated UE capability. For example, the UE may receive the signaling, using antenna(s) and/or receiver/transceiver components of UE 104 shown in FIG. 1 or FIG. 3 and/or of the apparatus shown in FIG. 20.

Note that FIG. 15 is just one example of a method, and other methods including fewer, additional, or alternative steps are possible consistent with this disclosure.

Figure 16:
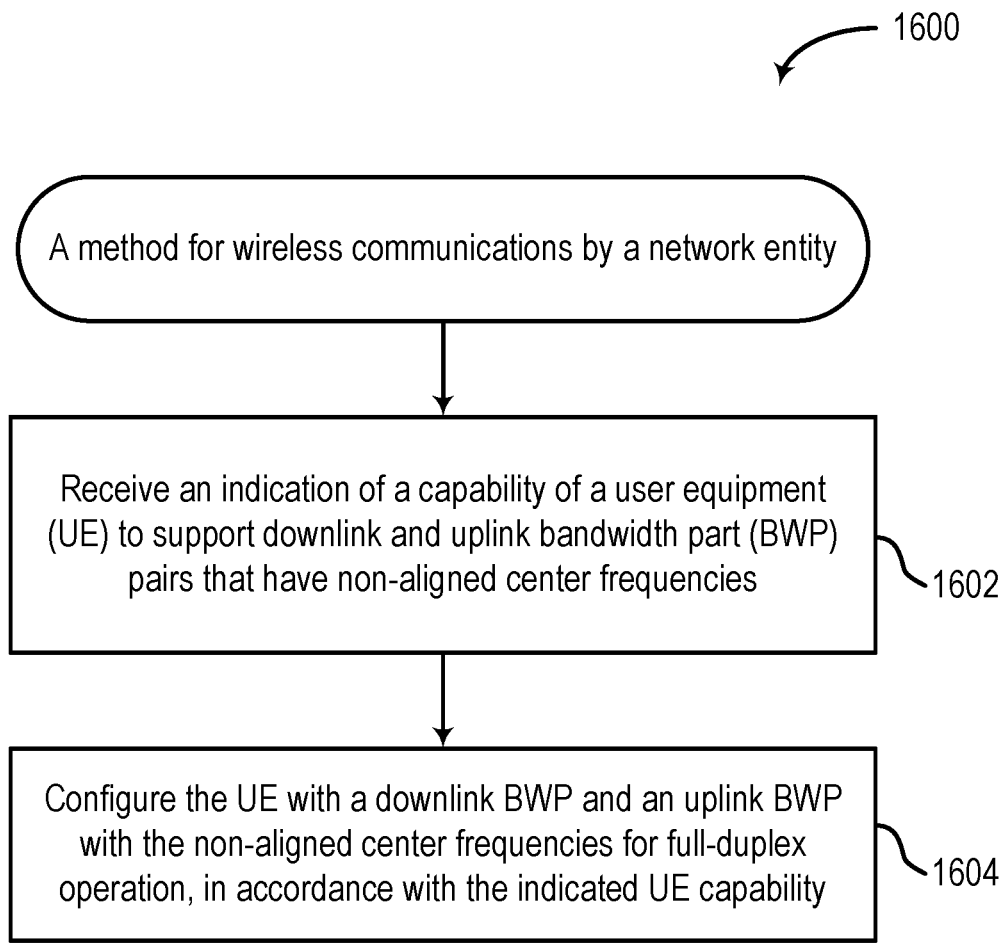
FIG. 16 depicts a method for wireless communications by a network entity.

FIG. 16 illustrates example operations 1600 for wireless communication. The operations 1600 may be performed, for example, by a network entity (e.g., such as BS 102 in wireless communication network 100 of FIG. 1). The operations 1600 may be implemented as software components that are executed and run on one or more processors (e.g., controller/processor 340 of FIG. 3). Further, transmission and reception of signals by the network entity in the operations 1600 may be enabled, for example, by one or more antennas (e.g., antennas 334 of FIG. 3). In certain aspects, the transmission and/or reception of signals by the network entity may be implemented via a bus interface of one or more processors (e.g., the controller/processor 340) obtaining and/or outputting signals.

The operations 1600 begin, at 1602, by receiving an indication of a capability of a UE to support downlink and uplink BWP pairs that have non-aligned center frequencies. For example, the network entity may receive the indication, using antenna(s) and/or receiver/transceiver components of BS 102 shown in FIG. 1 or FIG. 3 and/or of the apparatus shown in FIG. 21.

At 1604, the network entity configures the UE with a downlink BWP and an uplink BWP with the non-aligned center frequencies for full-duplex operation, in accordance with the indicated UE capability. For example, the network entity may configure the UE, using antenna(s) and/or transmitter/transceiver components of BS 102 shown in FIG. 1 or FIG. 3 and/or of the apparatus shown in FIG. 21.

Note that FIG. 16 is just one example of a method, and other methods including fewer, additional, or alternative steps are possible consistent with this disclosure.

Aspects Related to Changing Transmitter (TX) Radio Frequency (RF) Bandwidth (BF) and Receiver (RX) RF BW Aspects of the present disclosure provide apparatuses, methods, processing systems, and computer-readable mediums for supporting changing radio frequency (RF) bandwidth (BF). For example, when a user equipment (UE) has a capability to change a transmission RF BW and/or a reception RF BW, the UE is able to switch from an RF wideband half-duplex transmission and/or receive operation to a partial downlink/receive or uplink/transmit RF band frequency division multiplexed (FDMed) full-duplex operation.

Figure 17:
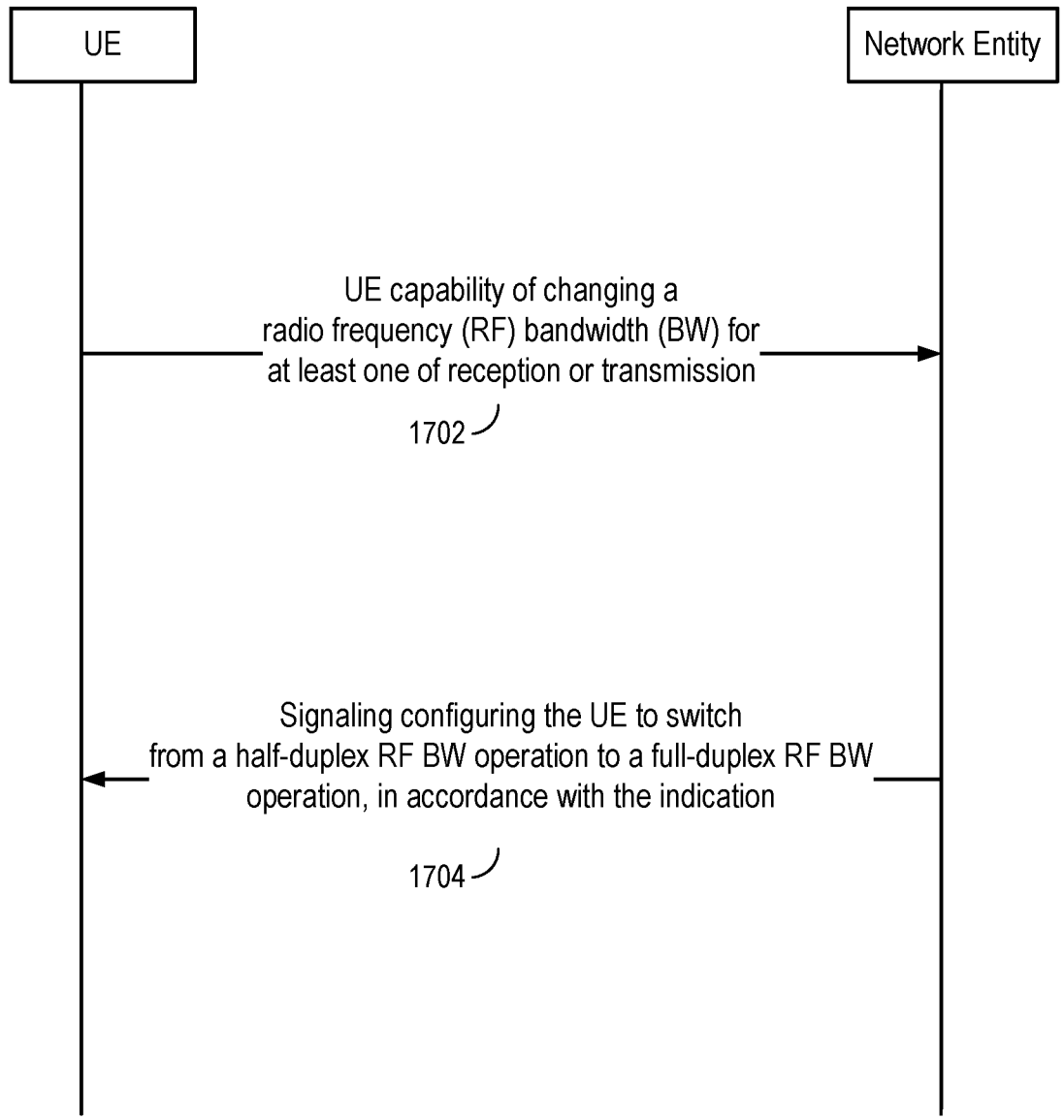
FIG. 17 depicts a call flow diagram illustrating example communication between a UE and a network entity.
Figure 19:
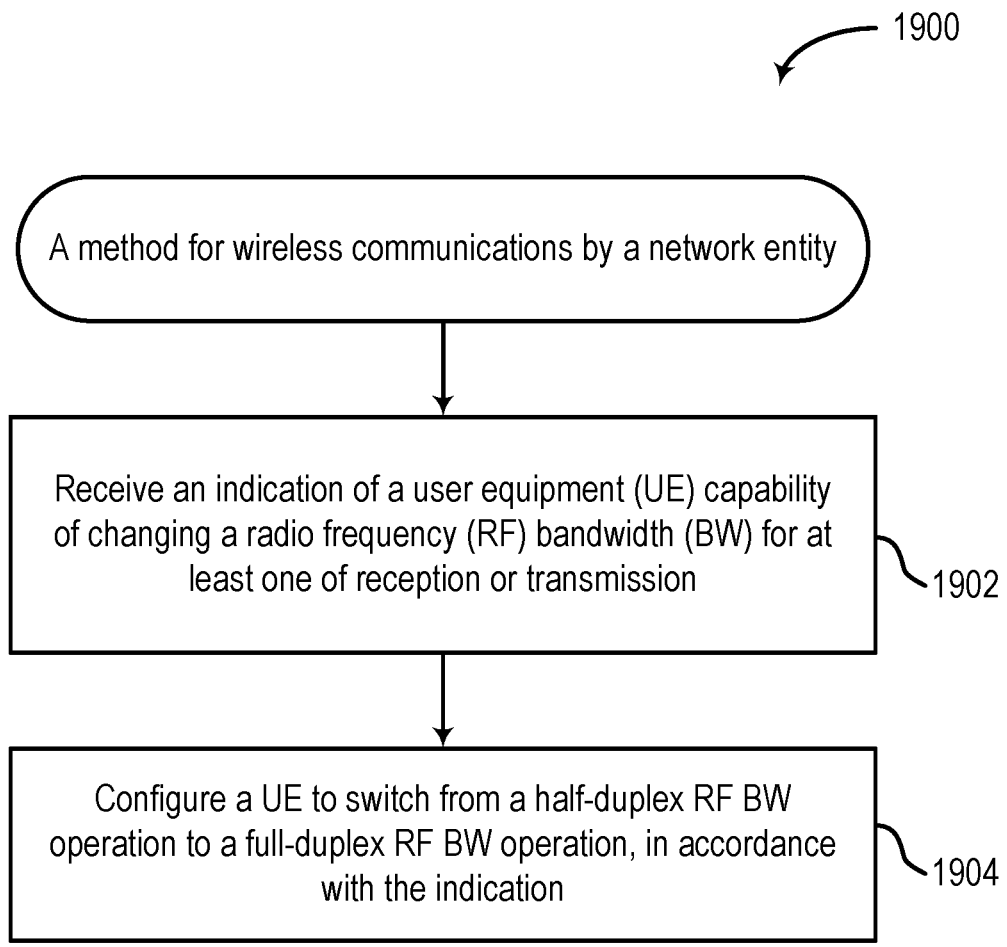
FIG. 19 depicts a method for wireless communications by a network entity.

Techniques proposed herein for supporting changing the transmission RF BW and/or the reception RF BW may be understood with reference to the FIGS. 17-19.

As illustrated in FIG. 17, at 1702, a UE (e.g., such as UE 104 in wireless communication network 100 of FIG. 1) transmits an indication of a UE capability of changing an RF BW for at least one of reception or transmission to a network entity (e.g., such as gNodeB (gNB) or BS 102 in wireless communication network 100 of FIG. 1).

At 1704, the network entity transmits to the UE signaling configuring the UE to switch from a half-duplex RF BW operation to a full-duplex RF BW operation, in accordance with the indication.

In certain aspects, a hardware of the UE may enable dynamically changing the RF BW. In certain aspects, a hardware of the UE may not enable dynamically changing the RF BW.

In certain aspects, the RF BW is a transmission RF BW. In certain aspects, the RF BW is a reception RF BW.

In certain aspects, the half-duplex RF BW operation is an RF wideband half-duplex transmission operation. In certain aspects, the half-duplex RF BW operation is an RF wideband half-duplex reception operation.

In certain aspects, the full-duplex RF BW operation is a partial downlink or reception full-duplex RF BW operation. In certain aspects, the full-duplex RF BW operation is a partial uplink or transmission full-duplex RF BW operation.

FIG. 18 illustrates example operations 1800 for wireless communication. The operations 1800 may be performed, for example, by a UE (e.g., such as UE 104 in wireless communication network 100 of FIG. 1). The operations 1800 may be implemented as software components that are executed and run on one or more processors (e.g., controller/processor 380 of FIG. 3). Further, transmission and reception of signals by the UE in the operations 1800 may be enabled, for example, by one or more antennas (e.g., antennas 352 of FIG. 3). In certain aspects, the transmission and/or reception of signals by the UE may be implemented via a bus interface of one or more processors (e.g., the controller/processor 380) obtaining and/or outputting signals.

The operations 1800 begin, at 1802, by transmitting an indication of a UE capability of changing an RF BW for at least one of reception or transmission. For example, the UE may transmit the indication, using antenna(s) and/or transmitter/transceiver components of UE 104 shown in FIG. 1 or FIG. 3 and/or of the apparatus shown in FIG. 22.

At 1804, the UE receives signaling configuring the UE to switch from a half-duplex RF BW operation to a full-duplex RF BW operation, in accordance with the indication. For example, the UE may receive the signaling, using antenna(s) and/or receiver/transceiver components of UE 104 shown in FIG. 1 or FIG. 3 and/or of the apparatus shown in FIG. 22.

Note that FIG. 18 is just one example of a method, and other methods including fewer, additional, or alternative steps are possible consistent with this disclosure.

FIG. 19 illustrates example operations 1900 for wireless communication. The operations 1900 may be performed, for example, by a network entity (e.g., such as BS 102 in wireless communication network 100 of FIG. 1). The operations 1900 may be implemented as software components that are executed and run on one or more processors (e.g., controller/processor 340 of FIG. 3). Further, transmission and reception of signals by the network entity in the operations 1900 may be enabled, for example, by one or more antennas (e.g., antennas 334 of FIG. 3). In certain aspects, the transmission and/or reception of signals by the network entity may be implemented via a bus interface of one or more processors (e.g., the controller/processor 340) obtaining and/or outputting signals.

The operations 1900 begin, at 1902, by receiving an indication of a UE capability of changing an RF BW for at least one of reception or transmission. For example, the network entity may receive the indication, using antenna(s) and/or receiver/transceiver components of BS 102 shown in FIG. 1 or FIG. 3 and/or of the apparatus shown in FIG. 23.

At 1904, the network entity configures a UE to switch from a half-duplex RF BW operation to a full-duplex RF BW operation, in accordance with the indication. For example, the network entity may configure the UE, using antenna(s) and/or transmitter/transceiver components of BS 102 shown in FIG. 1 or FIG. 3 and/or of the apparatus shown in FIG. 23.

Note that FIG. 19 is just one example of a method, and other methods including fewer, additional, or alternative steps are possible consistent with this disclosure.

The techniques proposed herein have several advantages. For example, when a network entity schedules multiple UEs for full-duplex operation, the network entity can prioritize to select the UEs from the multiple UEs (if other conditions are similar) for the full-duplex operation based on a capability (i.e., changing the RF BW for the reception and/or the transmission) of the UEs. This may prevent cross-link interference (CLI) between the selected UEs (e.g., because when the UEs do not have the capability to switch to a partial receive RF BW, a downlink UE may receive inter-UE CLI from an uplink UE in the wideband receive RF BW).

In certain aspects, when both the downlink UE and the uplink UE have RF filters, and certain parameters are met (e.g., a minimum GB between the downlink BWP and the uplink BWP) to avoid leakage, the network entity may skip configuring inter-UE CLI measurements since the leakage can be fully avoided based on the minimum GB configured for FDMed full-duplex operation.

In certain aspects, the network entity may schedule FDMed full-duplex operation for the downlink UE with a closer jammer (e.g., the uplink UE) in the separated downlink BWP and the uplink BWP. In certain aspects, when the UEs are at a same distance from each other, the network entity can schedule FDMed full-duplex operation for the downlink UE and the uplink UE with a higher data rate.

Example Communications Devices

Figure 20:
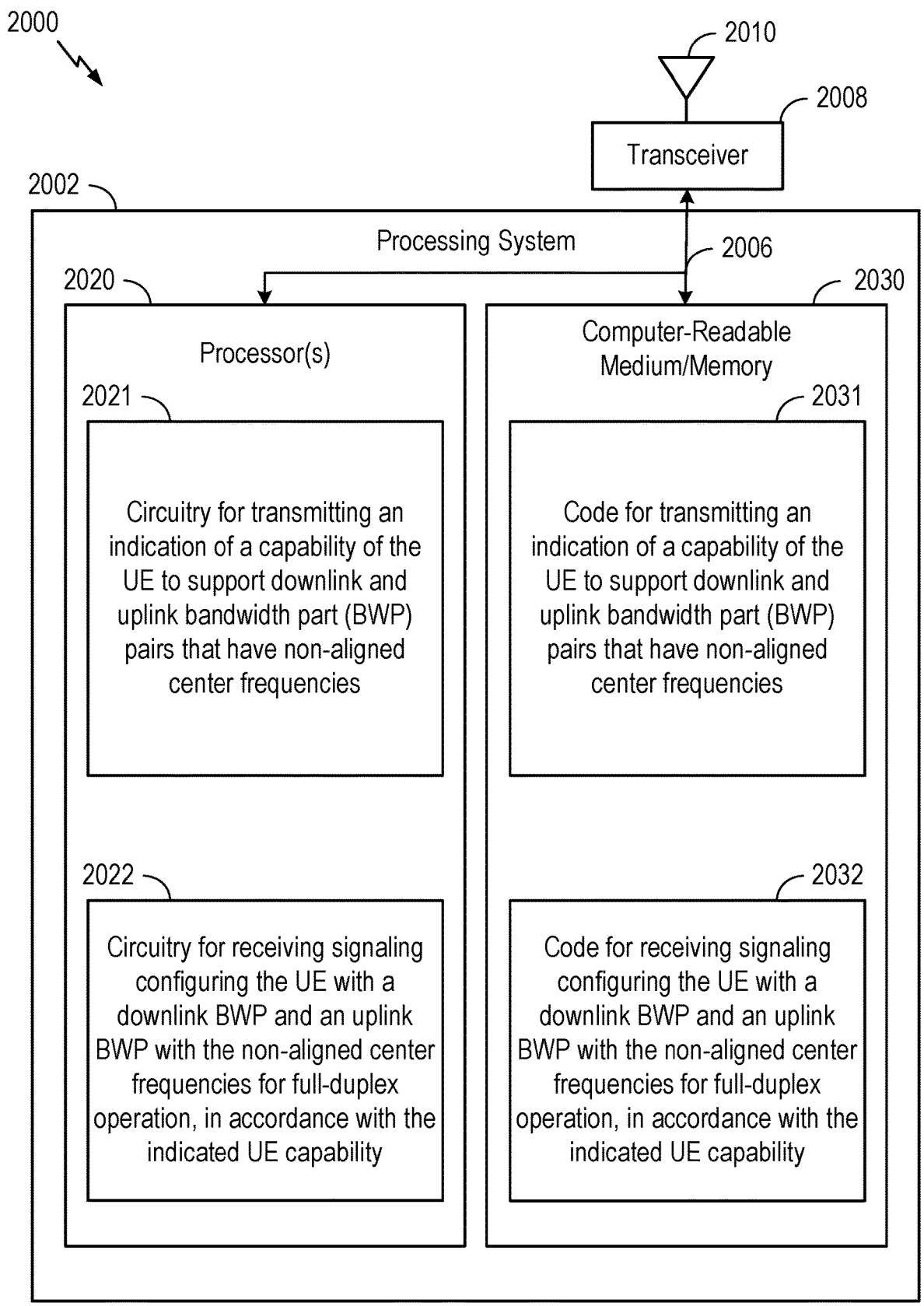
FIGS. 20-23 depict aspects of example communications devices.

FIG. 20 depicts aspects of an example communications device 2000. In some aspects, communications device 2000 is a UE, such as UE 104 described above with respect to FIGS. 1 and 3.

The communications device 2000 includes a processing system 2002 coupled to a transceiver 2008 (e.g., a transmitter and/or a receiver). The transceiver 2008 is configured to transmit and receive signals for the communications device 2000 via an antenna 2010, such as the various signals as described herein. The processing system 2002 may be configured to perform processing functions for the communications device 2000, including processing signals received and/or to be transmitted by the communications device 2000.

The processing system 2002 includes one or more processors 2020. In various aspects, the one or more processors 2020 may be representative of one or more of receive processor 358, transmit processor 364, TX MIMO processor 366, and/or controller/processor 380, as described with respect to FIG. 3. The one or more processors 2020 are coupled to a computer-readable medium/memory 2030 via a bus 2006. In certain aspects, the computer-readable medium/memory 2030 is configured to store instructions (e.g., computer-executable code) that when executed by the one or more processors 2020, cause the one or more processors 2020 to perform the operations 1500 described with respect to FIG. 15, or any aspect related to it. Note that reference to a processor performing a function of communications device 2000 may include one or more processors performing that function of communications device 2000.

In the depicted example, computer-readable medium/memory 2030 stores code (e.g., executable instructions) for transmitting 2031 comprising code for transmitting an indication of a capability of the UE to support downlink and uplink BWP pairs that have non-aligned center frequencies, and code for receiving 2032 comprising code for receiving signaling configuring the UE with a downlink BWP and an uplink BWP with the non-aligned center frequencies for full-duplex operation, in accordance with the indicated UE capability. Processing of the code 2031-2032 may cause the communications device 2000 to perform the operations 1500 described with respect to FIG. 15, or any aspect related to it.

The one or more processors 2020 include circuitry configured to implement (e.g., execute) the code stored in the computer-readable medium/memory 2030, including circuitry for transmitting 2021 comprising circuitry for transmitting an indication of a capability of the UE to support downlink and uplink BWP pairs that have non-aligned center frequencies, and circuitry for receiving 2022 comprising circuitry for receiving signaling configuring the UE with a downlink BWP and an uplink BWP with the non-aligned center frequencies for full-duplex operation, in accordance with the indicated UE capability. Processing with circuitry 2021-2022 may cause the communications device 2000 to perform the operations 1500 described with respect to FIG. 15, or any aspect related to it.

Various components of the communications device 2000 may provide means for performing the operations 1500 described with respect to FIG. 15, or any aspect related to it. For example, means for transmitting, sending or outputting for transmission may include the transceivers 354 and/or antenna(s) 352 of the UE 104 illustrated in FIG. 3 and/or transceiver 2008 and antenna 2010 of the communications device 2000 in FIG. 20. Means for receiving or obtaining may include the transceivers 354 and/or antenna(s) 352 of the UE 104 illustrated in FIG. 3 and/or transceiver 2008 and antenna 2010 of the communications device 2000 in FIG. 20.

Figure 21:
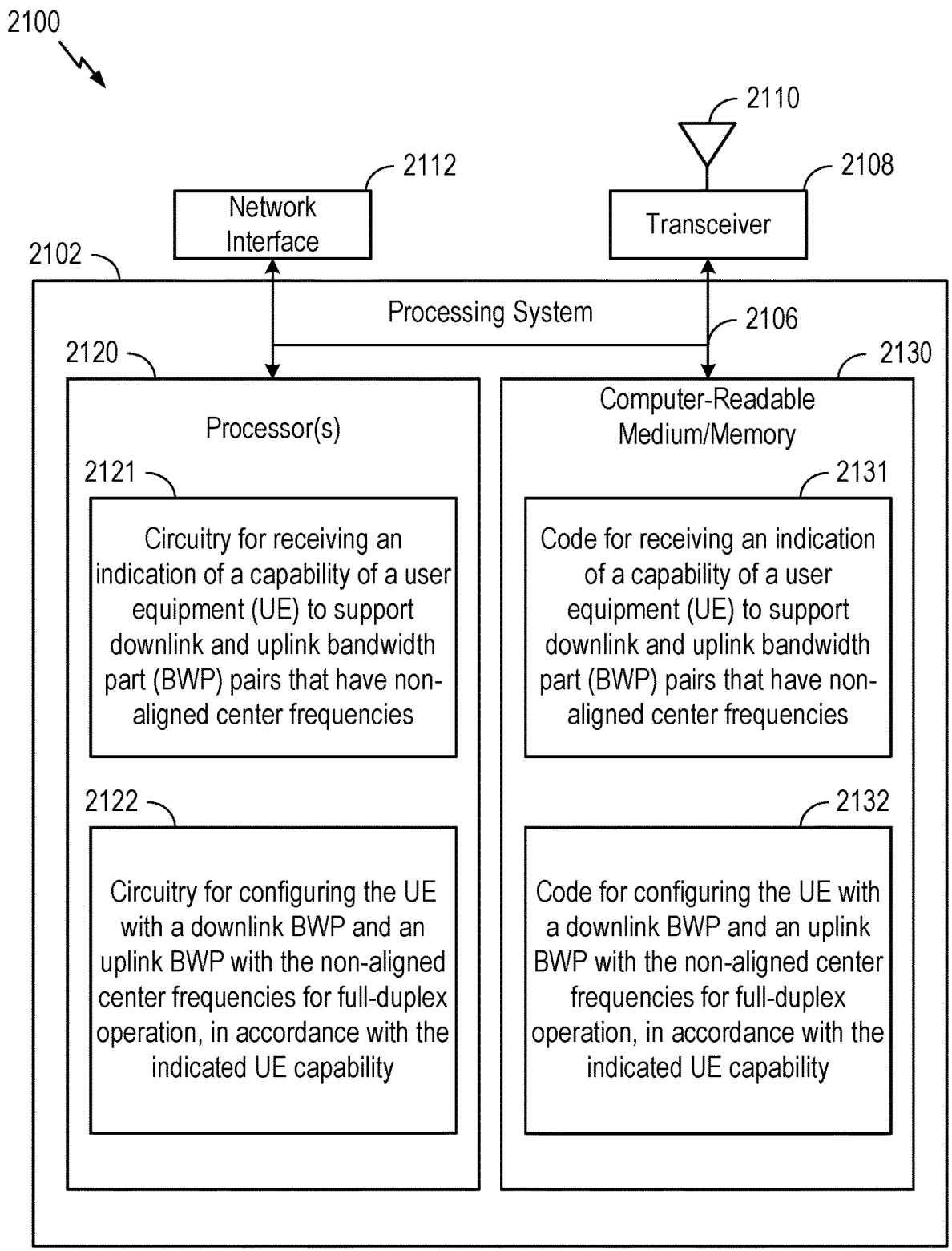

FIG. 21 depicts aspects of an example communications device 2100. In some aspects, communications device 2100 is a network entity, such as BS 102 described above with respect to FIGS. 1 and 3.

The communications device 2100 includes a processing system 2102 coupled to a transceiver 2108 (e.g., a transmitter and/or a receiver) and/or a network interface. The transceiver 2108 is configured to transmit and receive signals for the communications device 2100 via an antenna 2110, such as the various signals as described herein. The network interface 2112 is configured to obtain and send signals for the communications device 2100 via communications link(s), such as a backhaul link, midhaul link, and/or fronthaul link as described herein, such as with respect to FIG. 2. The processing system 2102 may be configured to perform processing functions for the communications device 2100, including processing signals received and/or to be transmitted by the communications device 2100.

The processing system 2102 includes one or more processors 2120. In various aspects, one or more processors 2120 may be representative of one or more of receive processor 338, transmit processor 320, TX MIMO processor 330, and/or controller/processor 340, as described with respect to FIG. 3. The one or more processors 2120 are coupled to a computer-readable medium/memory 2130 via a bus 2106. In certain aspects, the computer-readable medium/memory 2130 is configured to store instructions (e.g., computer-executable code) that when executed by the one or more processors 2120, cause the one or more processors 2120 to perform the operations 1600 described with respect to FIG. 16, or any aspect related to it. Note that reference to a processor of communications device 2100 performing a function may include one or more processors of communications device 2100 performing that function.

In the depicted example, the computer-readable medium/memory 2130 stores code (e.g., executable instructions) for receiving 2131 comprising code for receiving an indication of a capability of a UE to support downlink and uplink BWP pairs that have non-aligned center frequencies, and code for configuring 2132 comprising code for configuring the UE with a downlink BWP and an uplink BWP with the non-aligned center frequencies for full-duplex operation, in accordance with the indicated UE capability. Processing of the code 2131-2132 may cause the communications device 2100 to perform the operations 1600 described with respect to FIG. 16, or any aspect related to it.

The one or more processors 2120 include circuitry configured to implement (e.g., execute) the code stored in the computer-readable medium/memory 2130, including circuitry for receiving 2121 comprising circuitry for receiving an indication of a capability of a UE to support downlink and uplink BWP pairs that have non-aligned center frequencies, and circuitry for configuring 2122 comprising circuitry for configuring the UE with a downlink BWP and an uplink BWP with the non-aligned center frequencies for full-duplex operation, in accordance with the indicated UE capability.

Processing with circuitry 2121-2122 may cause the communications device 2100 to perform the operations 1600 as described with respect to FIG. 16, or any aspect related to it.

Various components of the communications device 2100 may provide means for performing the operations 1600 as described with respect to FIG. 16, or any aspect related to it. Means for transmitting, sending or outputting for transmission may include the transceivers 332 and/or antenna(s) 334 of the BS 102 illustrated in FIG. 3 and/or transceiver 2108 and antenna 2110 of the communications device 2100 in FIG. 21. Means for receiving or obtaining may include the transceivers 332 and/or antenna(s) 334 of the BS 102 illustrated in FIG. 3 and/or transceiver 2108 and antenna 2110 of the communications device 2100 in FIG. 21.

Figure 22:
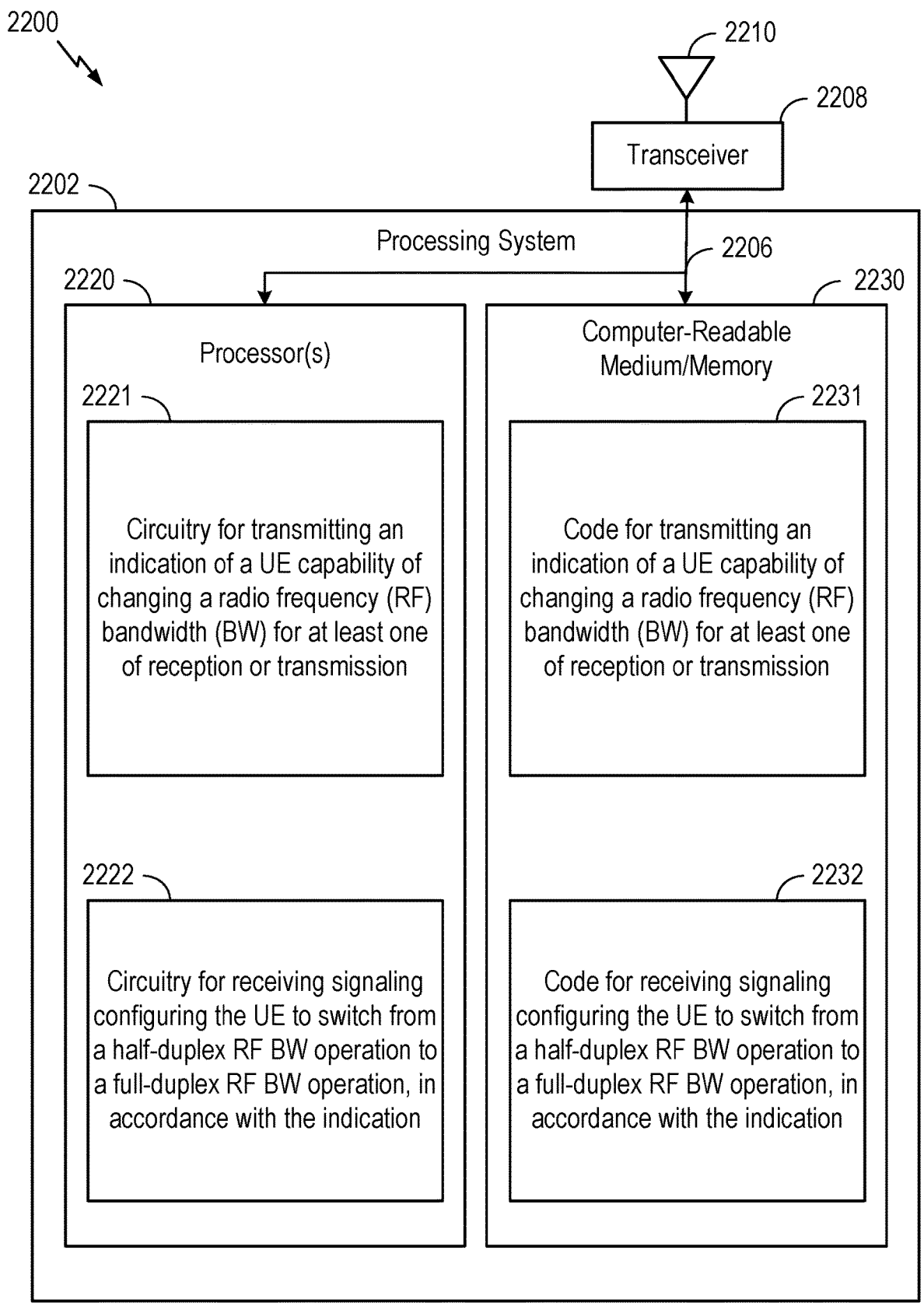

FIG. 22 depicts aspects of an example communications device 2200. In some aspects, communications device 2200 is a UE, such as UE 104 described above with respect to FIGS. 1 and 3.

The communications device 2200 includes a processing system 2202 coupled to a transceiver 2208 (e.g., a transmitter and/or a receiver). The transceiver 2208 is configured to transmit and receive signals for the communications device 2200 via an antenna 2210, such as the various signals as described herein. The processing system 2202 may be configured to perform processing functions for the communications device 2200, including processing signals received and/or to be transmitted by the communications device 2200.

The processing system 2202 includes one or more processors 2220. In various aspects, the one or more processors 2220 may be representative of one or more of receive processor 358, transmit processor 364, TX MIMO processor 366, and/or controller/processor 380, as described with respect to FIG. 3. The one or more processors 2020 are coupled to a computer-readable medium/memory 2230 via a bus 2206. In certain aspects, the computer-readable medium/memory 2230 is configured to store instructions (e.g., computer-executable code) that when executed by the one or more processors 2220, cause the one or more processors 2220 to perform the operations 1800 described with respect to FIG. 18, or any aspect related to it. Note that reference to a processor performing a function of communications device 2200 may include one or more processors performing that function of communications device 2200.

In the depicted example, computer-readable medium/memory 2230 stores code (e.g., executable instructions) for transmitting 2231 comprising code for transmitting an indication of a UE capability of changing an RF BW for at least one of reception or transmission, and code for receiving 2232 comprising code for receiving signaling configuring the UE to switch from a half-duplex RF BW operation to a full-duplex RF BW operation, in accordance with the indication. Processing of the code 2231-2232 may cause the communications device 2200 to perform the operations 1800 described with respect to FIG. 18, or any aspect related to it.

The one or more processors 2220 include circuitry configured to implement (e.g., execute) the code stored in the computer-readable medium/memory 2230, including circuitry for transmitting 2221 comprising circuitry for transmitting an indication of a UE capability of changing an RF BW for at least one of reception or transmission, and circuitry for receiving 2222 comprising circuitry for receiving signaling configuring the UE to switch from a half-duplex RF BW operation to a full-duplex RF BW operation, in accordance with the indication. Processing with circuitry 2221-2222 may cause the communications device 2200 to perform the operations 1800 described with respect to FIG. 18, or any aspect related to it.

Various components of the communications device 2200 may provide means for performing the operations 1800 described with respect to FIG. 18, or any aspect related to it. For example, means for transmitting, sending or outputting for transmission may include the transceivers 354 and/or antenna(s) 352 of the UE 104 illustrated in FIG. 3 and/or transceiver 2208 and antenna 2210 of the communications device 2200 in FIG. 22. Means for receiving or obtaining may include the transceivers 354 and/or antenna(s) 352 of the UE 104 illustrated in FIG. 3 and/or transceiver 2208 and antenna 2210 of the communications device 2200 in FIG. 22.

Figure 23:
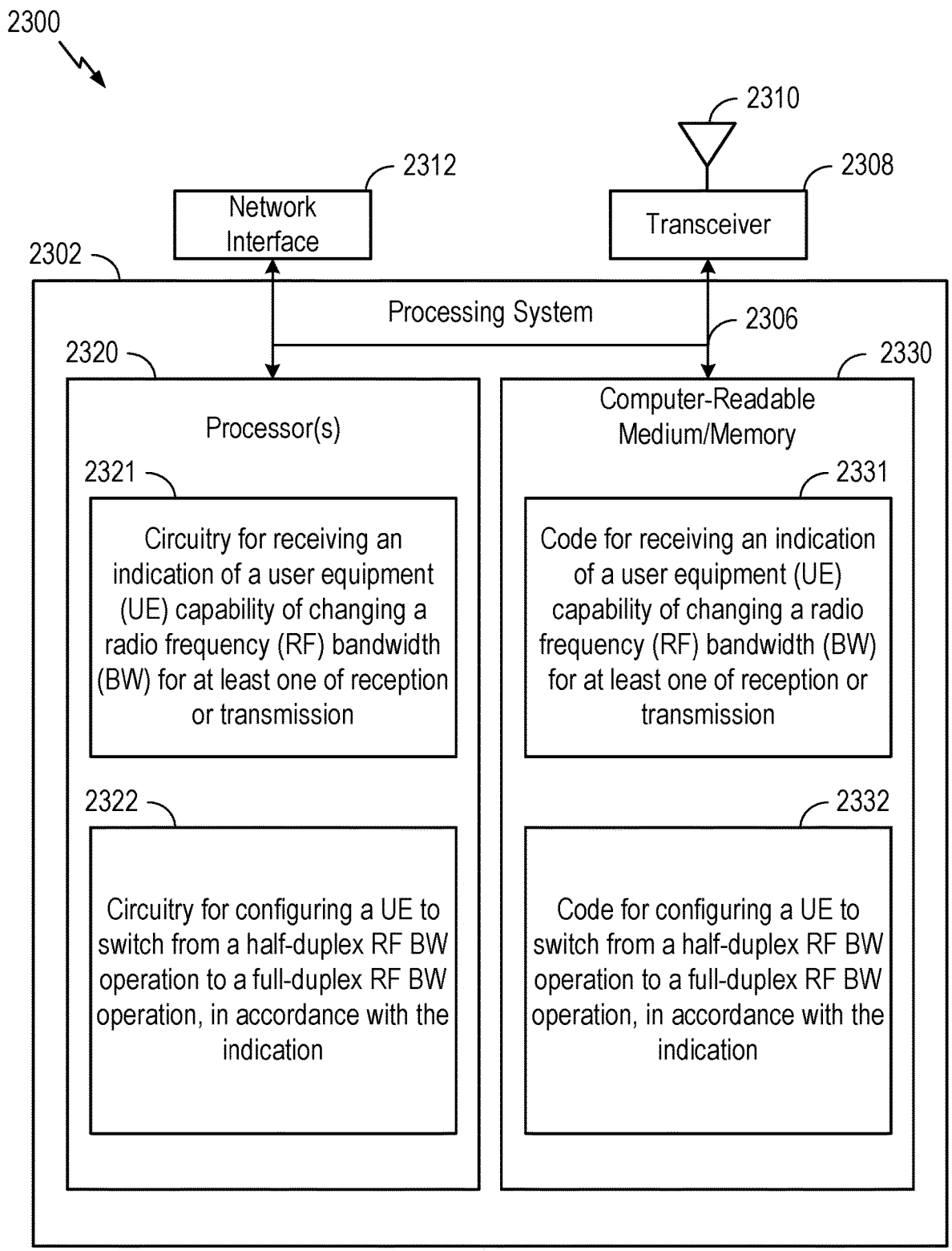

FIG. 23 depicts aspects of an example communications device 2300. In some aspects, communications device 2300 is a network entity, such as BS 102 described above with respect to FIGS. 1 and 3.

The communications device 2300 includes a processing system 2302 coupled to a transceiver 2308 (e.g., a transmitter and/or a receiver) and/or a network interface. The transceiver 2308 is configured to transmit and receive signals for the communications device 2300 via an antenna 2310, such as the various signals as described herein. The network interface 2312 is configured to obtain and send signals for the communications device 2300 via communications link(s), such as a backhaul link, midhaul link, and/or fronthaul link as described herein, such as with respect to FIG. 2. The processing system 2302 may be configured to perform processing functions for the communications device 2300, including processing signals received and/or to be transmitted by the communications device 2300.

The processing system 2302 includes one or more processors 2320. In various aspects, one or more processors 2320 may be representative of one or more of receive processor 338, transmit processor 320, TX MIMO processor 330, and/or controller/processor 340, as described with respect to FIG. 3. The one or more processors 2320 are coupled to a computer-readable medium/memory 2330 via a bus 2306. In certain aspects, the computer-readable medium/memory 2330 is configured to store instructions (e.g., computer-executable code) that when executed by the one or more processors 2320, cause the one or more processors 2320 to perform the operations 1900 described with respect to FIG. 19, or any aspect related to it. Note that reference to a processor of communications device 2300 performing a function may include one or more processors of communications device 2300 performing that function.

In the depicted example, the computer-readable medium/memory 2330 stores code (e.g., executable instructions) for receiving 2331 comprising code for receiving an indication of a UE capability of changing an RF BW for at least one of reception or transmission, and code for configuring 2332 comprising code for configuring a UE to switch from a half-duplex RF BW operation to a full-duplex RF BW operation, in accordance with the indication. Processing of the code 2331-2332 may cause the communications device 2300 to perform the operations 1900 described with respect to FIG. 19, or any aspect related to it.

The one or more processors 2320 include circuitry configured to implement (e.g., execute) the code stored in the computer-readable medium/memory 2330, including circuitry for receiving 2321 comprising circuitry for receiving an indication of a UE capability of changing an RF BW for at least one of reception or transmission, and circuitry for configuring 2322 comprising circuitry for configuring a UE to switch from a half-duplex RF BW operation to a full-duplex RF BW operation, in accordance with the indication. Processing with circuitry 2321-2322 may cause the communications device 2300 to perform the operations 1900 as described with respect to FIG. 19, or any aspect related to it.

Various components of the communications device 2300 may provide means for performing the operations 1900 as described with respect to FIG. 19, or any aspect related to it. Means for transmitting, sending or outputting for transmission may include the transceivers 332 and/or antenna(s) 334 of the BS 102 illustrated in FIG. 3 and/or transceiver 2308 and antenna 2310 of the communications device 2300 in FIG. 23. Means for receiving or obtaining may include the transceivers 332 and/or antenna(s) 334 of the BS 102 illustrated in FIG. 3 and/or transceiver 2308 and antenna 2310 of the communications device 2300 in FIG. 23.

Example Clauses

Implementation examples are described in the following numbered clauses:

Clause 1: A method for wireless communications by a user equipment (UE), comprising: transmitting an indication of a capability of the UE to support downlink and uplink bandwidth part (BWP) pairs that have non-aligned center frequencies; and receiving signaling configuring the UE with a downlink BWP and an uplink BWP with the non-aligned center frequencies for full-duplex operation, in accordance with the capability.

Clause 2: The method alone or in combination with the first clause, wherein the downlink BWP and the uplink BWP do not overlap.

Clause 3: The method alone or in combination with the first clause, wherein the downlink BWP and the uplink BWP are separated by a guard band (GB).

Clause 4: The method alone or in combination with the first clause, wherein the downlink BWP and the uplink BWP partially overlap.

Clause 5: The method alone or in combination with the first clause, wherein the full-duplex operation is in an unpaired time division duplex (TDD) spectrum.

Clause 6: A method for wireless communications by a network entity, comprising: receiving an indication of a capability of a user equipment (UE) to support downlink and uplink bandwidth part (BWP) pairs that have non-aligned center frequencies; and configuring the UE with a downlink BWP and an uplink BWP with the non-aligned center frequencies for full-duplex operation, in accordance with the capability.

Clause 7: The method alone or in combination with the sixth clause, wherein the downlink BWP and the uplink BWP do not overlap.

Clause 8: The method alone or in combination with the sixth clause, wherein the downlink BWP and the uplink BWP are separated by a guard band (GB).

Clause 9: The method alone or in combination with the sixth clause, wherein the downlink BWP and the uplink BWP partially overlap.

Clause 10: The method alone or in combination with the sixth clause, wherein the full-duplex operation is in an unpaired time division duplex (TDD) spectrum.

Clause 11: A method for wireless communications by a user equipment (UE), comprising: transmitting an indication of a UE capability of changing a radio frequency (RF) bandwidth (BW) for at least one of reception or transmission; and receiving signaling configuring the UE to switch from a half-duplex RF BW operation to a full-duplex RF BW operation, in accordance with the indication.

Clause 12: The method alone or in combination with the eleventh clause, wherein a hardware of the UE enables dynamically changing the RF BW.

Clause 13: The method alone or in combination with the eleventh clause, wherein a hardware of the UE does not enable dynamically changing the RF BW.

Clause 14: The method alone or in combination with the eleventh clause, wherein the RF BW is a transmission RF BW.

Clause 15: The method alone or in combination with the eleventh clause, wherein the RF BW is a reception RF BW.

Clause 16: The method alone or in combination with the eleventh clause, wherein the half-duplex RF BW operation is an RF wideband half-duplex transmission operation.

Clause 17: The method alone or in combination with the eleventh clause, wherein the half-duplex RF BW operation is an RF wideband half-duplex reception operation.

Clause 18: The method alone or in combination with the eleventh clause, wherein the full-duplex RF BW operation is a partial downlink or reception full-duplex RF BW operation.

Clause 19: The method alone or in combination with the eleventh clause, wherein the full-duplex RF BW operation is a partial uplink or transmission full-duplex RF BW operation.

Clause 20: A method for wireless communications by a network entity, comprising: receiving an indication of a user equipment (UE) capability of changing a radio frequency (RF) bandwidth (BW) for at least one of reception or transmission; and configuring a UE to switch from a half-duplex RF BW operation to a full-duplex RF BW operation, in accordance with the indication.

Clause 21: The method alone or in combination with the twentieth clause, wherein the RF BW is a transmission RF BW.

Clause 22: The method alone or in combination with the twentieth clause, wherein the RF BW is a reception RF BW.

Clause 23: The method alone or in combination with the twentieth clause, wherein the half-duplex RF BW operation is an RF wideband half-duplex transmission operation.

Clause 24: The method alone or in combination with the twentieth clause, wherein the half-duplex RF BW operation is an RF wideband half-duplex reception operation.

Clause 25: The method alone or in combination with the twentieth clause, wherein the full-duplex RF BW operation is a partial downlink or reception full-duplex RF BW operation.

Clause 26: The method alone or in combination with the twentieth clause, wherein the full-duplex RF BW operation is a partial uplink or transmission full-duplex RF BW operation.

Clause 27: An apparatus, comprising: a memory comprising executable instructions; and a processor configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by a processor of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A user equipment (UE) configured for wireless communications, comprising:
a memory comprising instructions; and
one or more processors, individually or collectively, configured to execute the instructions and cause the UE to:
transmit an indication of a capability of the UE to support downlink and uplink bandwidth part (BWP) pairs having a same BWP identifier (ID) and that have non-aligned center frequencies; and
receive signaling configuring the UE with a downlink BWP and an uplink BWP having the same BWP ID and with the non-aligned center frequencies for full-duplex operation, in accordance with the capability.

2. The UE of claim 1, wherein the downlink BWP and the uplink BWP do not overlap.

3. The UE of claim 1, wherein the downlink BWP and the uplink BWP are separated by a guard band (GB).

4. The UE of claim 1, wherein the downlink BWP and the uplink BWP partially overlap.

5. The UE of claim 1, wherein the full-duplex operation is in an unpaired time division duplex (TDD) spectrum.

6. A network entity configured for wireless communications, comprising:
a memory comprising instructions; and
one or more processors, individually or collectively, configured to execute the instructions and cause the network entity to:
receive an indication of a capability of a user equipment (UE) to support downlink and uplink bandwidth part (BWP) pairs having a same BWP identifier (ID) and that have non-aligned center frequencies; and
configure the UE with a downlink BWP and an uplink BWP having the same BWP ID and with the non-aligned center frequencies for full-duplex operation, in accordance with the capability.

7. The network entity of claim 6, wherein the downlink BWP and the uplink BWP do not overlap.

8. The network entity of claim 6, wherein the downlink BWP and the uplink BWP are separated by a guard band (GB).

9. The network entity of claim 6, wherein the downlink BWP and the uplink BWP partially overlap.

10. The network entity of claim 6, wherein the full-duplex operation is in an unpaired time division duplex (TDD) spectrum.

11. A user equipment (UE) configured for wireless communications, comprising:
a memory comprising instructions; and
one or more processors, individually or collectively, configured to execute the instructions and cause the UE to:
transmit an indication of a UE capability of changing a transmission radio frequency (RF) bandwidth (BW) for uplink transmissions and a reception RF BW for downlink transmissions; and
receive signaling configuring the UE to switch from a half-duplex RF BW operation to a full-duplex RF BW operation, in accordance with the indication.

12. The UE of claim 11, wherein a hardware of the UE enables dynamically changing the transmission RF BW and the reception RF BW.

13. The UE of claim 11, wherein a hardware of the UE does not enable dynamically changing the transmission RF BW and the reception RF BW.

14. The UE of claim 11, wherein the half-duplex RF BW operation is an RF wideband half-duplex transmission operation.

15. The UE of claim 11, wherein the half-duplex RF BW operation is an RF wideband half-duplex reception operation.

16. The UE of claim 11, wherein the full-duplex RF BW operation is a partial downlink full-duplex RF BW operation.

17. The UE of claim 11, wherein the full-duplex RF BW operation is a partial uplink full-duplex RF BW operation.

18. A network entity configured for wireless communications, comprising:
   a memory comprising instructions; and
   one or more processors, individually or collectively, configured to execute the instructions and cause the network entity to:
   receive an indication of a user equipment (UE) capability of changing a transmission radio frequency (RF) bandwidth (BW) for uplink transmissions and a reception RF BW for downlink transmissions; and
   configure a UE to switch from a half-duplex RF BW operation to a full-duplex RF BW operation, in accordance with the indication.

19. The network entity of claim 18, wherein the half-duplex RF BW operation is an RF wideband half-duplex transmission operation.

20. The network entity of claim 18, wherein the half-duplex RF BW operation is an RF wideband half-duplex reception operation.

21. The network entity of claim 18, wherein the full-duplex RF BW operation is a partial downlink full-duplex RF BW operation.

22. The network entity of claim 18, wherein the full-duplex RF BW operation is a partial uplink full-duplex RF BW operation.

* * * * *